US010454328B2

(12) United States Patent
Shiraki et al.

(10) Patent No.: US 10,454,328 B2
(45) Date of Patent: *Oct. 22, 2019

(54) CORELESS ROTATING ELECTRICAL MACHINE INCLUDING STATOR COMPRISING CYLINDRICAL COIL AND COOLING METHOD THEREFOR

(71) Applicant: M-LINK CO., LTD., Yamato-shi, Kanagawa (JP)

(72) Inventors: Manabu Shiraki, Yamato (JP); Shuichi Omomo, Yamato (JP)

(73) Assignee: M-LINK CO., LTD., Yamato (JP)

( * ) Notice: Subject to any disclaimer, the term of this patent is extended or adjusted under 35 U.S.C. 154(b) by 102 days.

This patent is subject to a terminal disclaimer.

(21) Appl. No.: 15/572,362

(22) PCT Filed: Dec. 8, 2016

(86) PCT No.: PCT/JP2016/086579
§ 371 (c)(1),
(2) Date: Nov. 7, 2017

(87) PCT Pub. No.: WO2017/130580
PCT Pub. Date: Aug. 3, 2017

(65) Prior Publication Data
US 2018/0062471 A1 Mar. 1, 2018

(30) Foreign Application Priority Data

Mar. 3, 2016 (JP) ................................ 2016-040612

(51) Int. Cl.
*H02K 1/32* (2006.01)
*H02K 1/27* (2006.01)
(Continued)

(52) U.S. Cl.
CPC .............. *H02K 1/32* (2013.01); *H02K 1/272* (2013.01); *H02K 1/2786* (2013.01); *H02K 1/28* (2013.01);
(Continued)

(58) Field of Classification Search
None
See application file for complete search history.

(56) References Cited

U.S. PATENT DOCUMENTS 5,397,975 A * 3/1995 Syverson .............. H02J 7/1423
310/181
5,502,368 A * 3/1996 Syverson .............. H02J 7/1423
310/181
(Continued)

FOREIGN PATENT DOCUMENTS

JP   H05-022133 A   1/1993
JP   H05-344680 A   12/1993
(Continued)

OTHER PUBLICATIONS

Feb. 28, 2017 International Search Report issued in International Patent Application No. PCT/JP2016/086579.

*Primary Examiner* — Dimary S Lopez Cruz
(74) *Attorney, Agent, or Firm* — Oliff PLC

(57) ABSTRACT

The present invention relates to a high performance rotating electrical machine which aims at downsizing, and challenges inevitable technical problems such as deterioration of efficiency η caused by copper loss and temperature rise inside the rotating electrical machine due to heat generation induced by eddy current generated in a magnetic body. Such technical problem may be solved by configuring a coreless rotating electrical machine as comprising a stator having a cylindrical coil of a laminate structure consisting of two-
(Continued)

layer or four-layer conductive metal sheets and a lid-type mount which fixes one of end faces of the cylindrical coil, and a rotor having a cup-type mount opposingly positioned with respect to the lid-type mount, with an air gap formed by a bottom, an inner cylindrical air-channel forming body and an outer cylindrical air-channel forming body, in which the cylindrical coil is arranged as suspended, and a plurality of magnets equipped on the outer cylindrical air-channel forming body and/or the inner cylindrical air-channel forming body, the cup-type mount has intake holes leading to the second air space on the bottom and a plurality of exhaust holes leading to the air gap, positioned in a row around a circumference of the outer cylindrical air-channel forming body, close to the bottom, and/or a plurality of exhaust holes leading to the air gap, consisting of arrays in a lengthwise direction of the air gap, from the open end face to the bottom with equally spaced intervals on the circumference of the outer cylindrical air-channel forming body, wherein ambient air taken into the second air space and/or ambient air taken into the outer side of the cylindrical coil, under differential pressure generated around the rotor by rotation thereof, are configured to directly cool a plurality of the magnets exposed in the air gap and both surfaces of the cylindrical coil arranged in the air gap, and to be discharged from the exhaust holes of the rotating outer cylindrical air-channel forming body.

3 Claims, 9 Drawing Sheets

(51) Int. Cl.
| | | |
|---|---|---|
| *H02K 1/28* | (2006.01) |
| *H02K 3/24* | (2006.01) |
| *H02K 21/22* | (2006.01) |
| *H02K 9/04* | (2006.01) |
| *H02K 3/26* | (2006.01) |
| *H02K 9/02* | (2006.01) |
| *H02K 3/47* | (2006.01) |
| *H02K 7/08* | (2006.01) |
| *H02K 9/06* | (2006.01) |

(52) U.S. Cl.
CPC .............. *H02K 3/24* (2013.01); *H02K 3/26* (2013.01); *H02K 3/47* (2013.01); *H02K 7/085* (2013.01); *H02K 9/02* (2013.01); *H02K 9/04* (2013.01); *H02K 9/06* (2013.01); *H02K 21/22* (2013.01)

(56) References Cited

U.S. PATENT DOCUMENTS

| | | | | |
|---|---|---|---|---|
| 5,656,922 | A * | 8/1997 | LaVelle | H02J 7/1423 310/181 |
| 5,747,909 | A * | 5/1998 | Syverson | H02H 7/06 310/114 |
| 6,104,111 | A * | 8/2000 | Pullen | H02K 1/20 310/58 |
| 6,437,468 | B2 * | 8/2002 | Stahl | H02K 1/32 310/261.1 |
| 8,018,108 | B2 * | 9/2011 | Lafontaine | H02K 1/16 310/112 |
| 2012/0299408 | A1 * | 11/2012 | Higuchi | H02K 1/2793 310/63 |
| 2013/0221772 | A1 * | 8/2013 | Miyamoto | H02K 9/19 310/54 |
| 2014/0333163 | A1 * | 11/2014 | Horii | H02K 1/20 310/59 |

FOREIGN PATENT DOCUMENTS

| | | |
|---|---|---|
| JP | H07-56593 Y2 | 12/1995 |
| JP | 2657192 B2 | 9/1997 |
| JP | 2831348 B2 | 12/1998 |
| JP | 3494056 B2 | 2/2004 |
| JP | 3704044 B2 | 10/2005 |
| JP | 2006-246678 A | 9/2006 |
| JP | 2012-016218 A | 1/2012 |
| JP | 2012-030786 A | 2/2012 |
| JP | 5943333 BI | 7/2016 |
| WO | 2013/060070 A1 | 5/2013 |

* cited by examiner (a)

| Time (min) | No holes, 2000rpm | | | Only holes Hr, 2000rpm | | | Only holes Hs, 2000rpm | | | Holes Hr and Hs, 2000rpm | | |
|---|---|---|---|---|---|---|---|---|---|---|---|---|
| | Coil temperature | Actual measurement | Ambient | Coil temperature | Actual measurement | Ambient | Coil temperature | Actual measurement | Ambient | Coil temperature | Actual measurement | Ambient |
| 0 | 30.4 | 28.1 | 22.7 | 31.6 | 28.1 | 21.3 | 29.9 | 27.7 | 22.8 | 29.4 | 26.2 | 21.8 |
| 0.5 | 67.3 | 64.8 | 22.5 | 67.6 | 64.1 | 21.5 | 63.6 | 61.2 | 22.6 | 62.9 | 60.0 | 22.1 |
| 1 | 81.4 | 79.0 | 22.6 | 82.6 | 79.1 | 21.5 | 76.8 | 74.6 | 22.8 | 76.8 | 74.0 | 22.2 |
| 1.5 | 88.8 | 86.2 | 22.4 | 89.0 | 85.6 | 21.6 | 83.5 | 81.2 | 22.7 | 83.4 | 80.8 | 22.4 |
| 2 | 93.1 | 90.5 | 22.4 | 93.0 | 89.6 | 21.6 | 87.2 | 84.9 | 22.7 | 87.5 | 84.8 | 22.3 |
| 2.5 | 96.4 | 93.8 | 22.4 | 96.1 | 92.6 | 21.5 | 90.2 | 88.0 | 22.8 | 90.8 | 88.0 | 22.2 |
| 3 | 99.1 | 96.5 | 22.4 | 98.3 | 94.8 | 21.5 | 93.0 | 90.8 | 22.8 | 93.3 | 90.5 | 22.2 |
| 3.5 | 101.2 | 98.7 | 22.5 | 100.7 | 97.2 | 21.5 | 95.0 | 92.8 | 22.8 | 95.5 | 92.7 | 22.2 |
| 4 | 103.5 | 100.9 | 22.4 | 102.7 | 99.1 | 21.4 | 97.2 | 95.0 | 22.8 | 97.6 | 94.8 | 22.2 |
| 4.5 | 105.2 | 102.7 | 22.5 | 104.4 | 100.8 | 21.4 | 98.9 | 96.8 | 22.9 | 99.5 | 96.8 | 22.3 |
| 5 | 107.1 | 104.6 | 22.5 | 105.8 | 102.4 | 21.6 | 100.6 | 98.4 | 22.8 | 101.2 | 98.5 | 22.3 |
| 5.5 | 108.5 | 106.0 | 22.5 | 106.9 | 103.6 | 21.7 | 102.4 | 100.2 | 22.8 | 103.1 | 100.5 | 22.4 |
| 6 | 110.5 | 108.0 | 22.5 | 108.6 | 105.3 | 21.7 | 103.8 | 101.6 | 22.8 | 104.2 | 101.5 | 22.3 |
| 6.5 | 111.6 | 109.1 | 22.5 | 110.2 | 107.0 | 21.8 | 105.3 | 103.1 | 22.8 | 105.6 | 102.9 | 22.4 |
| 7 | 113.0 | 110.5 | 22.5 | 111.5 | 108.2 | 21.7 | 106.6 | 104.4 | 22.8 | 106.3 | 103.7 | 22.4 |
| 7.5 | 114.2 | 111.8 | 22.4 | 112.0 | 108.8 | 21.8 | 108.0 | 105.8 | 22.8 | 107.9 | 105.2 | 22.3 |
| 8 | 116.0 | 113.5 | 22.5 | 113.3 | 110.2 | 21.9 | 109.0 | 106.8 | 22.8 | 109.0 | 106.3 | 22.3 |
| 8.5 | 117.4 | 114.8 | 22.4 | 113.8 | 110.8 | 21.9 | 110.5 | 108.3 | 22.8 | 110.2 | 107.4 | 22.2 |
| 9 | 118.4 | 115.8 | 22.4 | 115.2 | 112.1 | 21.9 | 111.2 | 109.0 | 22.8 | 110.9 | 108.2 | 22.3 |
| 9.5 | 119.4 | 116.7 | 22.3 | 116.3 | 113.0 | 21.7 | 112.2 | 109.9 | 22.7 | 111.8 | 109.2 | 22.4 |
| 10 | 120.3 | 117.6 | 22.5 | 117.2 | 114.2 | 22.0 | 113.0 | 110.8 | 22.8 | 112.7 | 110.1 | 22.4 |
| 10.5 | 121.2 | 118.7 | 22.5 | 117.7 | 114.7 | 22.0 | 114.3 | 112.0 | 22.7 | 113.7 | 111.1 | 22.4 |
| 11 | 122.2 | 119.7 | 22.5 | 118.4 | 115.4 | 22.0 | 115.3 | 113.3 | 22.7 | 114.3 | 111.9 | 22.3 |
| 11.5 | 123.1 | 120.8 | 22.4 | 119.2 | 116.2 | 22.0 | 115.6 | 113.5 | 22.8 | 115.2 | 112.7 | 22.3 |
| 12 | 124.8 | 122.0 | 22.2 | 119.9 | 116.8 | 22.0 | 116.6 | 114.3 | 22.7 | 115.8 | 113.3 | 22.3 |
| 12.5 | 124.8 | 122.2 | 22.4 | 120.8 | 117.7 | 21.9 | 117.2 | 115.0 | 22.8 | 116.9 | 114.4 | 22.3 |
| 13 | 126.9 | 123.1 | 22.5 | 121.0 | 117.9 | 21.9 | 117.6 | 115.5 | 22.9 | 117.1 | 114.8 | 22.5 |
| 13.5 | 126.9 | 124.0 | 22.5 | 121.6 | 118.6 | 22.2 | 118.3 | 116.2 | 22.9 | 117.9 | 115.5 | 22.5 |
| 14 | 127.7 | 125.1 | 22.4 | 122.3 | 119.3 | 22.2 | 119.2 | 117.1 | 22.9 | 118.4 | 115.9 | 22.5 |
| 14.5 | 128.1 | 125.6 | 22.5 | 122.9 | 120.1 | 22.2 | 119.7 | 117.6 | 22.8 | 118.9 | 116.4 | 22.5 |
| 15 | 128.4 | 126.0 | 22.6 | 123.7 | 120.8 | 22.2 | 120.6 | 118.5 | 22.8 | 119.6 | 117.1 | 22.5 |
| 15.5 | 129.0 | 126.6 | 22.6 | 123.8 | 121.2 | 22.3 | 120.9 | 118.8 | 22.9 | 119.7 | 117.2 | 22.5 |
| 16 | 129.7 | 127.2 | 22.5 | 123.9 | 121.2 | 22.3 | 121.2 | 119.1 | 22.9 | 120.3 | 117.9 | 22.6 |
| 16.5 | 130.2 | 127.8 | 22.6 | 125.0 | 122.4 | 22.4 | 122.1 | 120.0 | 22.9 | 120.8 | 118.5 | 22.7 |
| 17 | 130.9 | 128.6 | 22.7 | 124.8 | 122.1 | 22.3 | 122.2 | 120.1 | 22.9 | 121.3 | 118.8 | 22.5 |
| 17.5 | 131.2 | 128.9 | 22.7 | 125.5 | 122.7 | 22.2 | 122.6 | 120.4 | 22.9 | 121.5 | 119.1 | 22.6 |
| 18 | 131.4 | 129.1 | 22.7 | 126.2 | 123.5 | 22.3 | 123.1 | 120.9 | 22.8 | 122.1 | 119.7 | 22.6 |
| 18.5 | 132.0 | 129.7 | 22.7 | 126.7 | 124.3 | 22.6 | 123.6 | 121.4 | 22.8 | 122.1 | 119.7 | 22.6 |
| 19 | 132.9 | 130.5 | 22.8 | 126.8 | 124.0 | 22.4 | 123.8 | 121.8 | 23.0 | 122.7 | 120.4 | 22.7 |
| 19.5 | 132.9 | 130.6 | 22.7 | 127.0 | 124.2 | 22.2 | 124.2 | 122.0 | 22.8 | 123.1 | 120.8 | 22.7 |
| 20 | 133.5 | 131.3 | 22.8 | 127.6 | 124.9 | 22.3 | 124.5 | 122.5 | 23.0 | 123.1 | 120.8 | 22.7 |
| 20.5 | 134.0 | 131.8 | 22.8 | 127.6 | 125.0 | 22.4 | 125.4 | 123.4 | 23.0 | 123.8 | 121.1 | 22.6 |
| 21 | 134.2 | 131.8 | 22.6 | 127.4 | 124.9 | 22.5 | 125.2 | 123.2 | 23.0 | 123.8 | 121.4 | 22.6 |
| 21.5 | 135.1 | 132.6 | 22.3 | 127.9 | 125.2 | 22.3 | 125.7 | 123.6 | 22.9 | 124.2 | 121.9 | 22.7 |
| 22 | 135.5 | 132.9 | 22.4 | 128.6 | 125.9 | 22.3 | 126.1 | 124.1 | 23.0 | 124.5 | 122.2 | 22.7 |
| 22.5 | 135.4 | 132.9 | 22.5 | 128.6 | 126.4 | 22.5 | 126.2 | 124.2 | 23.0 | 125.2 | 122.9 | 22.7 |
| 23 | 136.1 | 133.6 | 22.5 | 128.7 | 126.3 | 22.6 | 126.8 | 124.7 | 22.9 | 125.2 | 122.9 | 22.7 |
| 23.5 | 136.3 | 133.8 | 22.5 | 129.2 | 126.8 | 22.6 | 127.0 | 124.9 | 22.9 | 125.3 | 123.0 | 22.7 |
| 24 | 136.4 | 134.2 | 22.6 | 129.1 | 126.7 | 22.6 | 127.5 | 125.4 | 22.9 | 125.6 | 123.3 | 22.7 |
| 24.5 | 136.9 | 134.7 | 22.8 | 129.3 | 126.9 | 22.6 | 127.7 | 125.7 | 23.0 | 126.0 | 123.8 | 22.8 |
| 25 | 137.2 | 134.9 | 22.7 | 129.6 | 127.2 | 22.6 | 127.7 | 125.7 | 23.0 | 126.0 | 123.8 | 22.8 |
| 25.5 | 137.5 | 135.2 | 22.7 | 128.9 | 127.5 | 22.5 | 127.6 | 125.6 | 23.0 | 126.4 | 124.2 | 22.8 |
| 26 | 137.9 | 135.5 | 22.6 | 130.1 | 127.9 | 22.8 | 128.2 | 126.2 | 23.0 | 126.5 | 124.3 | 22.8 |
| 26.5 | 138.4 | 136.0 | 22.6 | 130.4 | 128.2 | 22.8 | 128.6 | 126.6 | 23.0 | 126.3 | 124.2 | 22.9 |
| 27 | 138.1 | 135.8 | 22.6 | 130.7 | 128.6 | 22.8 | 128.6 | 126.6 | 23.0 | 127.0 | 125.1 | 22.8 |
| 27.5 | 138.5 | 136.2 | 22.7 | 130.6 | 128.5 | 22.9 | 128.8 | 126.8 | 23.1 | 127.2 | 125.0 | 22.8 |
| 28 | 139.0 | 136.7 | 22.7 | 131.0 | 128.8 | 22.8 | 128.8 | 126.9 | 23.1 | 127.0 | 124.8 | 22.8 |
| 28.5 | 139.1 | 136.8 | 22.7 | 131.1 | 128.7 | 22.6 | 129.2 | 127.2 | 23.0 | 127.4 | 125.3 | 22.8 |
| 29 | 139.3 | 136.8 | 22.5 | 131.2 | 128.9 | 22.7 | 129.5 | 127.5 | 23.0 | 127.5 | 125.3 | 22.8 |
| 29.5 | 140.3 | 137.3 | 22.5 | 131.1 | 128.8 | 22.7 | 129.7 | 127.7 | 23.0 | 127.6 | 125.4 | 22.8 |
| 30 | 140.0 | 137.6 | 22.6 | 131.6 | 129.2 | 22.6 | 130.0 | 128.0 | 23.0 | 128.1 | 125.9 | 22.8 |
| 30.5 | 140.0 | 137.7 | 22.7 | 132.1 | 129.7 | 22.6 | 130.1 | 128.0 | 22.9 | 128.2 | 126.0 | 22.8 |
| 31 | 140.4 | 138.1 | 22.7 | 132.0 | 129.7 | 22.7 | 130.2 | 128.2 | 23.0 | 128.4 | 126.1 | 22.7 |
| 31.5 | 140.3 | 138.0 | 22.7 | 132.1 | 129.8 | 22.7 | 130.5 | 128.4 | 22.9 | 128.4 | 126.2 | 22.8 |
| 32 | 140.8 | 138.3 | 22.5 | 131.9 | 129.5 | 22.6 | 130.4 | 128.4 | 23.0 | 128.9 | 126.7 | 22.8 |
| 32.5 | 140.7 | 138.3 | 22.6 | 132.5 | 130.1 | 22.6 | 130.8 | 128.6 | 22.8 | 129.0 | 126.7 | 22.7 |
| 33 | 141.3 | 138.7 | 22.7 | 132.8 | 130.7 | 22.9 | 130.8 | 128.8 | 23.0 | 128.9 | 126.8 | 22.7 |
| 33.5 | 141.0 | 138.7 | 22.7 | 133.1 | 130.9 | 22.8 | 131.1 | 129.1 | 23.0 | 129.2 | 126.9 | 22.7 |
| 34 | 141.5 | 139.0 | 22.5 | 133.8 | 131.3 | 22.4 | 130.9 | 129.0 | 23.1 | 129.4 | 127.1 | 22.7 |
| 34.5 | 141.6 | 139.1 | 22.5 | 133.4 | 131.0 | 22.6 | 131.5 | 129.5 | 23.0 | 129.2 | 127.1 | 22.9 |
| 35 | 141.6 | 139.2 | 22.6 | 133.5 | 131.0 | 22.5 | 131.6 | 129.5 | 22.9 | 129.3 | 127.1 | 22.8 |
| 35.5 | 142.1 | 139.7 | 22.6 | 133.6 | 131.3 | 22.7 | 131.7 | 129.7 | 23.0 | 129.6 | 127.2 | 22.7 |
| 36 | 141.8 | 139.5 | 22.7 | 133.7 | 131.4 | 22.7 | 131.7 | 129.7 | 23.0 | 129.8 | 127.6 | 22.7 |
| 36.5 | 142.3 | 139.9 | 22.6 | 133.5 | 131.0 | 22.6 | 132.1 | 130.1 | 23.0 | 129.8 | 127.5 | 22.7 |
| 37 | 142.7 | 140.2 | 22.5 | 135.5 | 132.9 | 22.4 | 131.9 | 129.9 | 23.0 | 129.5 | 127.4 | 22.8 |
| 37.5 | 142.1 | 139.7 | 22.6 | 133.9 | 131.6 | 22.7 | 131.5 | 129.6 | 23.1 | 129.7 | 127.6 | 22.8 |
| 38 | 142.6 | 140.2 | 22.6 | 133.7 | 131.6 | 22.9 | 131.9 | 130.0 | 23.1 | 130.0 | 127.7 | 22.8 |
| 38.5 | 142.9 | 140.4 | 22.5 | 133.6 | 131.7 | 23.1 | 131.7 | 129.7 | 23.0 | 129.8 | 127.6 | 22.8 |
| 39 | 142.9 | 140.5 | 22.6 | 134.1 | 132.1 | 23.0 | 132.5 | 130.5 | 23.0 | 130.1 | 127.9 | 22.8 |
| 39.5 | 142.8 | 140.3 | 22.7 | 134.0 | 132.0 | 23.0 | 132.5 | 130.5 | 23.0 | 130.0 | 128.0 | 22.8 |
| 40 | 142.8 | 140.4 | 22.6 | 134.1 | 132.3 | 23.2 | 132.6 | 130.6 | 23.0 | 130.3 | 128.2 | 22.8 |

FIG.7

| Time (min) | No holes, 4000rpm | | | Only holes Hr, 4000rpm | | | Only holes Hs, 4000rpm | | | Holes Hr and Hs, 4000rpm | | |
|---|---|---|---|---|---|---|---|---|---|---|---|---|
| | Coil temperature | Actual measurement | Ambient | Coil temperature | Actual measurement | Ambient | Coil temperature | Actual measurement | Ambient | Coil temperature | Actual measurement | Ambient |
| 0 | 31.0 | 28.4 | 22.4 | 31.0 | 28.9 | 22.9 | 30.1 | 27.8 | 22.7 | 27.9 | 24.7 | 21.8 |
| 0.5 | 68.1 | 66.5 | 23.4 | 65.5 | 64.0 | 23.5 | 62.5 | 61.0 | 23.5 | 60.0 | 57.5 | 22.5 |
| 1 | 81.8 | 80.0 | 23.2 | 77.2 | 75.7 | 23.5 | 73.6 | 72.1 | 23.6 | 70.2 | 67.9 | 22.7 |
| 1.5 | 87.9 | 86.3 | 23.4 | 83.0 | 81.2 | 23.2 | 79.4 | 77.8 | 23.4 | 74.7 | 72.5 | 22.6 |
| 2 | 91.9 | 90.3 | 23.4 | 86.1 | 84.3 | 23.2 | 82.9 | 81.2 | 23.3 | 78.2 | 75.8 | 22.6 |
| 2.5 | 95.4 | 93.9 | 23.5 | 88.9 | 86.9 | 23.0 | 85.2 | 83.7 | 23.5 | 80.5 | 78.4 | 22.9 |
| 3 | 98.2 | 96.6 | 23.4 | 90.8 | 89.0 | 23.2 | 87.1 | 85.8 | 23.7 | 82.3 | 80.3 | 23.0 |
| 3.5 | 100.4 | 98.9 | 23.5 | 92.7 | 91.0 | 23.3 | 89.2 | 87.7 | 23.5 | 84.2 | 82.2 | 23.0 |
| 4 | 102.4 | 100.7 | 23.3 | 94.2 | 92.6 | 23.4 | 90.7 | 89.4 | 23.7 | 85.6 | 83.6 | 23.0 |
| 4.5 | 104.2 | 102.7 | 23.5 | 95.7 | 94.2 | 23.5 | 92.3 | 90.8 | 23.5 | 87.2 | 84.9 | 22.7 |
| 5 | 105.5 | 103.9 | 23.4 | 96.8 | 95.2 | 23.4 | 93.8 | 92.3 | 23.5 | 88.3 | 86.2 | 22.9 |
| 5.5 | 107.2 | 105.9 | 23.7 | 98.2 | 96.5 | 23.5 | 95.0 | 93.5 | 23.5 | 89.6 | 87.6 | 23.0 |
| 6 | 108.9 | 107.6 | 23.7 | 99.4 | 97.8 | 23.5 | 95.9 | 94.4 | 23.5 | 90.5 | 88.4 | 22.9 |
| 6.5 | 109.9 | 108.5 | 23.6 | 100.4 | 98.7 | 23.3 | 97.1 | 95.6 | 23.5 | 90.9 | 89.3 | 23.4 |
| 7 | 111.4 | 109.9 | 23.5 | 100.8 | 99.2 | 23.4 | 97.9 | 96.3 | 23.4 | 92.0 | 90.1 | 23.1 |
| 7.5 | 111.8 | 110.5 | 23.7 | 101.7 | 100.0 | 23.3 | 98.6 | 97.2 | 23.7 | 92.5 | 90.7 | 23.2 |
| 8 | 113.2 | 111.7 | 23.5 | 102.7 | 101.0 | 23.3 | 99.2 | 98.0 | 23.8 | 93.4 | 91.6 | 23.2 |
| 8.5 | 114.4 | 113.1 | 23.7 | 103.3 | 101.8 | 23.3 | 99.7 | 98.5 | 23.8 | 94.0 | 92.2 | 23.2 |
| 9 | 115.1 | 113.7 | 23.6 | 103.9 | 102.1 | 23.2 | 100.1 | 99.0 | 23.9 | 94.7 | 92.7 | 23.0 |
| 9.5 | 115.7 | 114.2 | 23.5 | 104.3 | 102.7 | 23.4 | 101.0 | 99.8 | 23.8 | 95.1 | 93.1 | 23.0 |
| 10 | 116.4 | 114.9 | 23.5 | 104.6 | 103.0 | 23.4 | 101.5 | 100.3 | 23.8 | 95.7 | 93.6 | 22.9 |
| 10.5 | 116.7 | 115.4 | 23.7 | 104.8 | 103.6 | 23.8 | 101.6 | 100.8 | 24.2 | 95.7 | 94.1 | 23.4 |
| 11 | 117.4 | 116.2 | 23.8 | 105.6 | 104.2 | 23.6 | 102.1 | 101.2 | 24.1 | 96.5 | 94.5 | 23.0 |
| 11.5 | 117.6 | 116.7 | 23.9 | 106.0 | 104.7 | 23.7 | 102.3 | 101.6 | 24.3 | 96.6 | 94.8 | 23.2 |
| 12 | 118.8 | 117.7 | 23.9 | 106.4 | 104.9 | 23.5 | 102.5 | 101.7 | 24.2 | 97.0 | 95.1 | 23.1 |
| 12.5 | 119.3 | 118.2 | 23.9 | 106.8 | 105.3 | 23.7 | 103.4 | 102.4 | 24.0 | 97.4 | 95.6 | 23.2 |
| 13 | 119.7 | 118.5 | 23.8 | 107.1 | 105.6 | 23.5 | 103.3 | 102.5 | 24.2 | 97.0 | 95.7 | 23.7 |
| 13.5 | 119.8 | 118.7 | 23.9 | 107.3 | 106.3 | 23.4 | 103.6 | 102.9 | 24.3 | 97.4 | 96.0 | 23.6 |
| 14 | 120.8 | 119.8 | 24.0 | 107.8 | 106.2 | 23.4 | 103.7 | 103.1 | 24.4 | 98.1 | 96.2 | 23.1 |
| 14.5 | 120.6 | 119.4 | 23.6 | 108.0 | 106.3 | 23.3 | 104.5 | 103.6 | 24.1 | 98.3 | 96.4 | 23.1 |
| 15 | 121.9 | 120.6 | 23.7 | 108.2 | 106.8 | 23.8 | 104.5 | 103.7 | 24.2 | 98.8 | 97.0 | 23.2 |
| 15.5 | 121.8 | 120.7 | 23.8 | 108.1 | 106.8 | 23.7 | 104.7 | 104.0 | 24.3 | 98.6 | 96.8 | 23.2 |
| 16 | 122.0 | 120.9 | 23.8 | 108.5 | 107.1 | 23.6 | 104.8 | 104.0 | 24.2 | 98.8 | 97.0 | 23.2 |
| 16.5 | 122.5 | 121.4 | 23.9 | 109.2 | 107.7 | 23.5 | 105.1 | 104.3 | 24.2 | 98.6 | 97.4 | 23.8 |
| 17 | 122.7 | 121.6 | 23.9 | 109.2 | 107.7 | 23.5 | 105.3 | 104.4 | 24.1 | 99.2 | 97.4 | 23.2 |
| 17.5 | 123.2 | 122.0 | 23.8 | 109.1 | 107.7 | 23.6 | 105.4 | 104.7 | 24.3 | 99.4 | 97.8 | 23.5 |
| 18 | 123.2 | 121.9 | 23.7 | 109.0 | 107.7 | 23.7 | 105.7 | 104.9 | 24.2 | 99.3 | 98.0 | 23.7 |
| 18.5 | 123.5 | 122.3 | 23.8 | 109.3 | 108.0 | 23.7 | 105.8 | 104.9 | 24.1 | 99.0 | 97.9 | 23.9 |
| 19 | 123.7 | 122.6 | 23.9 | 110.0 | 108.5 | 23.5 | 106.1 | 105.3 | 24.2 | 98.9 | 97.7 | 23.8 |
| 19.5 | 124.4 | 123.2 | 23.8 | 110.1 | 108.6 | 23.5 | 106.3 | 105.5 | 24.2 | 98.5 | 98.5 | 24.0 |
| 20 | 124.7 | 123.3 | 23.6 | 109.9 | 108.4 | 23.6 | 106.4 | 105.6 | 24.2 | 99.4 | 98.3 | 23.9 |
| 20.5 | 124.6 | 123.3 | 23.7 | 109.7 | 108.5 | 23.8 | 106.2 | 105.4 | 24.2 | 100.0 | 98.7 | 23.7 |
| 21 | 125.4 | 124.3 | 23.9 | 110.1 | 108.7 | 23.6 | 106.7 | 105.7 | 24.0 | 99.9 | 98.8 | 23.9 |
| 21.5 | 125.6 | 124.0 | 23.5 | 110.1 | 108.7 | 23.6 | 106.7 | 105.9 | 24.2 | 99.9 | 98.8 | 23.9 |
| 22 | 125.5 | 124.0 | 23.5 | 110.3 | 108.9 | 23.6 | 106.4 | 106.0 | 24.6 | 100.0 | 98.9 | 23.9 |
| 22.5 | 126.1 | 124.7 | 23.6 | 110.5 | 109.1 | 23.6 | 106.9 | 106.1 | 24.2 | 99.8 | 98.7 | 23.9 |
| 23 | 126.0 | 124.5 | 23.5 | 110.3 | 109.1 | 23.8 | 106.7 | 106.4 | 24.7 | 100.2 | 99.1 | 23.8 |
| 23.5 | 125.8 | 124.2 | 23.4 | 110.9 | 109.5 | 23.6 | 106.5 | 106.1 | 24.6 | 100.0 | 99.1 | 24.1 |
| 24 | 125.6 | 124.2 | 23.6 | 110.7 | 109.3 | 23.6 | 106.8 | 106.6 | 24.8 | 100.0 | 99.1 | 24.1 |
| 24.5 | 125.8 | 124.2 | 23.3 | 110.7 | 109.5 | 23.8 | 106.8 | 106.5 | 24.7 | 100.4 | 99.4 | 24.0 |
| 25 | 126.7 | 125.1 | 23.4 | 110.9 | 109.5 | 23.6 | 107.4 | 106.6 | 24.2 | 100.3 | 99.3 | 24.0 |
| 25.5 | 126.1 | 124.8 | 23.5 | 110.6 | 109.3 | 23.5 | 107.5 | 106.7 | 24.2 | 100.6 | 99.7 | 24.1 |
| 26 | 127.0 | 125.2 | 23.2 | 111.0 | 109.6 | 23.6 | 107.5 | 106.6 | 24.1 | 100.4 | 99.6 | 24.2 |
| 26.5 | 126.7 | 125.1 | 23.4 | 111.7 | 110.1 | 23.4 | 107.3 | 106.7 | 24.4 | 100.4 | 99.8 | 24.4 |
| 27 | 126.7 | 125.1 | 23.6 | 111.2 | 109.8 | 23.6 | 107.4 | 106.7 | 24.3 | 100.8 | 99.9 | 24.1 |
| 27.5 | 127.0 | 125.5 | 23.6 | 111.3 | 109.9 | 23.6 | 107.5 | 106.8 | 24.4 | 100.8 | 100.2 | 24.3 |
| 28 | 127.1 | 126.0 | 23.9 | 111.2 | 110.1 | 23.8 | 107.6 | 106.8 | 24.2 | 100.9 | 100.1 | 24.2 |
| 28.5 | 126.9 | 125.8 | 23.7 | 111.4 | 110.2 | 23.8 | 107.3 | 106.9 | 24.6 | 101.1 | 100.3 | 24.2 |
| 29 | 127.2 | 126.0 | 23.8 | 111.7 | 110.4 | 23.7 | 107.3 | 107.0 | 24.7 | 100.7 | 100.2 | 24.5 |
| 29.5 | 127.5 | 126.2 | 23.7 | 111.4 | 110.1 | 23.7 | 107.5 | 107.0 | 24.5 | 100.5 | 100.3 | 24.6 |
| 30 | 127.6 | 126.4 | 23.8 | 111.5 | 110.2 | 23.7 | 107.7 | 106.8 | 24.6 | 100.9 | 100.5 | 24.6 |
| 30.5 | 127.9 | 126.8 | 23.9 | 111.9 | 110.5 | 23.6 | 107.6 | 107.0 | 24.4 | 101.1 | 100.4 | 24.6 |
| 31 | 127.5 | 126.4 | 23.8 | 112.1 | 110.6 | 23.5 | 107.7 | 106.9 | 24.2 | 100.5 | 100.2 | 24.7 |
| 31.5 | 127.8 | 126.5 | 23.8 | 111.8 | 110.2 | 23.7 | 107.7 | 107.2 | 24.5 | 101.1 | 100.5 | 24.4 |
| 32 | 127.9 | 126.7 | 24.2 | 111.6 | 110.3 | 23.7 | 107.7 | 107.4 | 24.7 | 100.4 | 100.4 | 25.0 |
| 32.5 | 128.1 | 126.8 | 23.7 | 112.1 | 110.8 | 23.7 | 107.7 | 107.2 | 24.6 | 100.7 | 100.5 | 24.8 |
| 33 | 128.3 | 127.2 | 23.8 | 111.9 | 110.7 | 23.8 | 107.6 | 107.1 | 24.3 | 101.1 | 100.4 | 24.3 |
| 33.5 | 127.8 | 126.3 | 23.8 | 111.9 | 110.6 | 23.7 | 107.6 | 107.0 | 24.4 | 101.7 | 100.7 | 24.0 |
| 34 | 128.1 | 126.6 | 23.5 | 111.7 | 110.5 | 23.8 | 107.6 | 107.1 | 24.5 | 101.5 | 100.5 | 24.0 |
| 34.5 | 128.4 | 127.1 | 23.7 | 112.2 | 110.8 | 23.6 | 107.6 | 107.0 | 24.4 | 102.0 | 100.9 | 23.9 |
| 35 | 128.7 | 127.5 | 23.8 | 112.2 | 110.8 | 23.6 | 107.7 | 107.2 | 24.5 | 102.0 | 100.8 | 23.8 |
| 35.5 | 128.0 | 126.9 | 23.9 | 112.3 | 111.0 | 23.7 | 107.9 | 107.3 | 24.4 | 101.9 | 100.6 | 23.9 |
| 36 | 128.1 | 127.1 | 23.8 | 111.7 | 110.6 | 23.9 | 108.2 | 107.0 | 23.8 | 101.6 | 101.1 | 24.5 |
| 36.5 | 128.2 | 127.3 | 24.1 | 112.0 | 110.7 | 23.7 | 108.5 | 107.2 | 23.7 | 101.9 | 100.9 | 24.0 |
| 37 | 128.5 | 127.2 | 23.7 | 112.5 | 111.2 | 23.8 | 108.1 | 107.3 | 24.2 | 101.8 | 101.0 | 24.2 |
| 37.5 | 128.3 | 127.0 | 23.7 | 112.3 | 110.8 | 23.6 | 108.3 | 107.3 | 23.7 | 102.0 | 101.1 | 24.1 |
| 38 | 128.5 | 127.2 | 23.7 | 112.1 | 110.8 | 23.7 | 108.3 | 107.5 | 24.2 | 102.4 | 101.5 | 24.1 |
| 38.5 | 128.6 | 128.3 | 23.7 | 112.3 | 111.2 | 23.9 | 108.5 | 107.5 | 24.0 | 101.8 | 101.2 | 24.4 |
| 39 | 128.8 | 127.5 | 23.7 | 112.2 | 110.8 | 23.7 | 108.6 | 107.6 | 24.0 | 101.6 | 101.1 | 24.5 |
| 39.5 | 128.9 | 127.7 | 23.8 | 112.2 | 111.1 | 23.9 | 108.1 | 107.5 | 24.4 | 101.5 | 101.0 | 24.5 |
| 40 | 128.7 | 127.6 | 23.9 | 112.0 | 111.0 | 24.0 | 107.8 | 107.6 | 24.7 | 101.4 | 101.2 | 24.8 |

FIG.8

| Time (min) | No holes, 6000rpm | | | Only holes Hr, 6000rpm | | | Only holes Hs, 6000rpm | | | Holes Hr and Hs, 6000rpm | | |
|---|---|---|---|---|---|---|---|---|---|---|---|---|
| | Coil temperature | Actual measurement | Ambient | Coil temperature | Actual measurement | Ambient | Coil temperature | Actual measurement | Ambient | Coil temperature | Actual measurement | Ambient |
| 0 | 32.1 | 28.8 | 21.7 | 27.9 | 25.7 | 22.8 | 28.6 | 25.9 | 22.3 | 32.2 | 27.2 | 20.0 |
| 0.5 | 69.9 | 67.3 | 22.4 | 60.7 | 59.6 | 23.8 | 60.9 | 59.3 | 23.4 | 63.7 | 60.0 | 21.3 |
| 1 | 81.5 | 79.2 | 22.7 | 70.2 | 69.5 | 24.3 | 70.6 | 69.0 | 23.4 | 71.6 | 68.3 | 21.7 |
| 1.5 | 87.1 | 85.1 | 23.0 | 74.7 | 74.0 | 24.3 | 74.3 | 73.3 | 24.0 | 74.6 | 71.8 | 22.7 |
| 2 | 91.0 | 89.2 | 23.2 | 77.6 | 77.0 | 24.4 | 76.9 | 75.8 | 23.9 | 76.8 | 74.0 | 22.3 |
| 2.5 | 94.3 | 92.7 | 23.4 | 79.5 | 79.4 | 24.5 | 79.1 | 78.2 | 24.1 | 78.0 | 75.7 | 22.7 |
| 3 | 96.5 | 95.0 | 23.5 | 81.5 | 81.3 | 24.8 | 81.0 | 80.0 | 24.0 | 79.1 | 77.0 | 22.9 |
| 3.5 | 98.2 | 97.0 | 23.8 | 83.0 | 83.0 | 25.0 | 82.4 | 81.6 | 24.2 | 80.1 | 78.1 | 23.0 |
| 4 | 100.5 | 99.2 | 23.7 | 84.1 | 84.3 | 25.2 | 83.5 | 82.9 | 24.4 | 81.0 | 79.0 | 23.0 |
| 4.5 | 102.0 | 100.4 | 23.4 | 85.3 | 85.4 | 25.1 | 84.1 | 83.9 | 24.8 | 81.8 | 79.9 | 23.1 |
| 5 | 103.0 | 101.8 | 23.8 | 86.3 | 86.6 | 25.3 | 85.2 | 84.9 | 24.7 | 82.4 | 80.3 | 22.9 |
| 5.5 | 104.0 | 103.0 | 24.0 | 87.2 | 87.5 | 25.3 | 86.0 | 85.7 | 24.7 | 82.4 | 81.0 | 23.8 |
| 6 | 105.3 | 104.3 | 24.0 | 87.7 | 88.2 | 25.5 | 87.0 | 86.7 | 24.7 | 83.3 | 81.5 | 23.2 |
| 6.5 | 106.1 | 105.3 | 24.2 | 88.4 | 89.0 | 25.5 | 87.6 | 87.2 | 24.6 | 83.6 | 81.9 | 23.3 |
| 7 | 107.4 | 106.4 | 24.0 | 89.5 | 89.7 | 25.2 | 88.6 | 87.9 | 24.3 | 84.0 | 82.4 | 23.4 |
| 7.5 | 108.6 | 107.4 | 23.8 | 90.1 | 90.3 | 25.2 | 88.8 | 88.4 | 24.6 | 84.2 | 82.7 | 23.5 |
| 8 | 108.2 | 108.2 | 24.0 | 90.6 | 90.8 | 25.2 | 88.8 | 88.7 | 24.0 | 84.3 | 82.9 | 23.6 |
| 8.5 | 109.1 | 108.2 | 24.1 | 90.8 | 91.2 | 25.4 | 89.1 | 89.1 | 25.0 | 84.9 | 83.3 | 23.4 |
| 9 | 109.8 | 108.9 | 24.1 | 90.6 | 91.5 | 25.9 | 89.8 | 89.6 | 24.8 | 84.6 | 83.5 | 23.9 |
| 9.5 | 110.2 | 109.3 | 24.1 | 91.8 | 92.0 | 25.2 | 90.6 | 90.1 | 24.5 | 84.9 | 83.9 | 24.0 |
| 10 | 110.5 | 109.8 | 24.3 | 92.5 | 92.5 | 25.0 | 91.3 | 90.5 | 24.2 | 86.4 | 84.1 | 22.7 |
| 10.5 | 111.0 | 110.4 | 24.4 | 91.9 | 92.8 | 25.5 | 91.6 | 90.7 | 24.1 | 86.4 | 84.3 | 22.9 |
| 11 | 111.1 | 110.8 | 24.5 | 92.4 | 93.1 | 25.7 | 92.0 | 91.1 | 24.1 | 85.7 | 84.4 | 23.7 |
| 11.5 | 111.5 | 111.0 | 24.5 | 92.2 | 93.2 | 26.0 | 92.5 | 91.4 | 23.9 | 85.7 | 84.6 | 23.9 |
| 12 | 111.9 | 111.4 | 24.6 | 93.4 | 93.5 | 25.1 | 92.7 | 91.7 | 24.0 | 85.7 | 84.6 | 23.8 |
| 12.5 | 112.3 | 111.9 | 24.6 | 93.8 | 93.8 | 25.0 | 92.6 | 91.9 | 24.1 | 86.2 | 84.7 | 23.5 |
| 13 | 112.8 | 112.0 | 24.5 | 93.9 | 93.9 | 25.0 | 92.9 | 92.1 | 24.2 | 86.1 | 85.0 | 23.9 |
| 13.5 | 112.6 | 112.2 | 24.6 | 94.4 | 94.1 | 24.7 | 93.2 | 92.3 | 24.1 | 85.9 | 85.0 | 24.1 |
| 14 | 113.1 | 112.4 | 24.3 | 94.4 | 94.3 | 24.9 | 93.3 | 92.4 | 24.1 | 85.9 | 85.1 | 24.2 |
| 14.5 | 113.1 | 112.8 | 24.7 | 94.4 | 94.3 | 24.9 | 93.6 | 92.6 | 24.0 | 86.3 | 85.2 | 23.9 |
| 15 | 113.8 | 113.1 | 24.3 | 94.8 | 94.4 | 24.6 | 93.9 | 92.8 | 23.9 | 86.3 | 85.2 | 23.9 |
| 15.5 | 114.0 | 113.3 | 24.3 | 94.4 | 94.3 | 24.9 | 93.9 | 92.9 | 24.0 | 86.3 | 85.2 | 23.9 |
| 16 | 114.1 | 113.4 | 24.3 | 94.1 | 94.4 | 25.3 | 94.1 | 93.1 | 24.0 | 86.0 | 85.4 | 24.4 |
| 16.5 | 113.4 | 113.5 | 25.1 | 93.8 | 94.6 | 25.8 | 94.0 | 93.2 | 24.2 | 86.3 | 85.4 | 24.1 |
| 17 | 114.0 | 113.6 | 24.6 | 93.8 | 94.6 | 25.5 | 94.7 | 93.4 | 23.7 | 86.6 | 85.4 | 23.8 |
| 17.5 | 114.0 | 113.9 | 24.9 | 94.8 | 94.9 | 25.1 | 94.7 | 93.5 | 23.8 | 86.7 | 85.5 | 23.8 |
| 18 | 114.4 | 113.9 | 24.5 | 95.1 | 95.1 | 25.0 | 94.5 | 93.5 | 24.0 | 86.7 | 85.5 | 23.9 |
| 18.5 | 115.0 | 114.5 | 24.5 | 94.8 | 95.0 | 25.2 | 94.5 | 93.7 | 24.2 | 86.6 | 85.5 | 23.9 |
| 19 | 115.4 | 114.7 | 24.3 | 95.1 | 95.2 | 25.1 | 94.7 | 93.7 | 24.0 | 86.8 | 85.6 | 23.8 |
| 19.5 | 115.2 | 114.7 | 24.5 | 95.2 | 95.3 | 25.1 | 94.6 | 93.7 | 24.1 | 86.5 | 85.6 | 24.1 |
| 20 | 115.4 | 114.6 | 24.2 | 94.6 | 95.2 | 25.6 | 94.7 | 93.9 | 24.2 | 86.6 | 85.6 | 24.1 |
| 20.5 | 116.0 | 114.7 | 24.7 | 95.3 | 95.3 | 25.0 | 94.9 | 94.0 | 24.1 | 86.2 | 85.6 | 24.4 |
| 21 | 115.5 | 114.9 | 24.4 | 95.3 | 95.4 | 25.1 | 95.0 | 94.1 | 24.1 | 86.6 | 85.6 | 24.0 |
| 21.5 | 115.7 | 114.9 | 24.2 | 94.8 | 95.5 | 25.7 | 95.0 | 94.2 | 24.2 | 86.8 | 85.8 | 24.0 |
| 22 | 115.7 | 115.2 | 24.5 | 94.4 | 95.4 | 26.0 | 95.0 | 94.1 | 24.1 | 86.7 | 85.9 | 24.2 |
| 22.5 | 116.0 | 115.5 | 24.5 | 95.5 | 95.7 | 25.2 | 95.2 | 94.2 | 24.0 | 86.5 | 85.8 | 24.3 |
| 23 | 115.7 | 115.1 | 24.4 | 94.8 | 95.6 | 25.8 | 95.1 | 94.2 | 24.1 | 86.6 | 85.9 | 24.1 |
| 23.5 | 115.6 | 115.2 | 24.6 | 94.1 | 95.6 | 25.5 | 95.1 | 94.3 | 24.2 | 86.7 | 85.9 | 24.7 |
| 24 | 116.0 | 115.6 | 24.5 | 95.6 | 95.6 | 25.0 | 95.3 | 94.5 | 24.2 | 86.8 | 86.1 | 24.2 |
| 24.5 | 116.2 | 115.8 | 24.6 | 96.6 | 95.8 | 25.1 | 95.2 | 94.5 | 24.3 | 86.4 | 86.1 | 24.7 |
| 25 | 115.9 | 115.8 | 25.0 | 95.2 | 95.8 | 25.6 | 95.4 | 94.4 | 24.0 | 86.4 | 86.2 | 24.8 |
| 25.5 | 115.5 | 115.7 | 25.2 | 94.8 | 95.7 | 25.9 | 95.7 | 94.6 | 23.9 | 86.7 | 86.2 | 24.3 |
| 26 | 116.5 | 116.3 | 24.6 | 95.4 | 95.8 | 25.4 | 95.8 | 94.6 | 23.7 | 86.6 | 86.3 | 24.7 |
| 26.5 | 116.2 | 116.2 | 25.0 | 95.1 | 95.8 | 25.7 | 95.4 | 94.6 | 24.2 | 87.0 | 86.4 | 24.4 |
| 27 | 116.4 | 116.3 | 24.9 | 95.5 | 96.0 | 25.5 | 95.7 | 94.7 | 24.0 | 87.0 | 86.4 | 24.4 |
| 27.5 | 116.2 | 116.1 | 24.9 | 95.8 | 96.1 | 25.3 | 95.8 | 94.7 | 23.9 | 87.4 | 86.4 | 24.0 |
| 28 | 116.6 | 116.4 | 24.8 | 96.4 | 96.3 | 24.9 | 95.2 | 94.7 | 24.8 | 87.5 | 86.3 | 23.8 |
| 28.5 | 115.8 | 115.9 | 25.1 | 96.4 | 96.4 | 25.0 | 94.6 | 94.5 | 25.0 | 87.0 | 86.3 | 24.3 |
| 29 | 115.6 | 115.9 | 25.3 | 96.4 | 96.4 | 25.0 | 95.6 | 94.7 | 24.2 | 87.0 | 86.3 | 24.3 |
| 29.5 | 116.2 | 116.2 | 25.0 | 95.7 | 96.3 | 25.6 | 95.5 | 94.7 | 24.2 | 88.0 | 86.5 | 23.5 |
| 30 | 116.8 | 116.6 | 24.8 | 95.2 | 96.2 | 26.0 | 95.6 | 94.7 | 24.1 | 87.3 | 86.6 | 24.3 |
| 30.5 | 117.1 | 116.7 | 24.6 | 95.5 | 96.2 | 25.7 | 95.5 | 94.7 | 24.2 | 86.9 | 86.6 | 24.7 |
| 31 | 116.8 | 116.5 | 24.9 | 96.3 | 96.5 | 25.2 | 95.3 | 94.6 | 24.3 | 87.5 | 86.6 | 24.0 |
| 31.5 | 117.0 | 116.4 | 24.4 | 96.5 | 96.6 | 25.3 | 94.5 | 94.5 | 25.0 | 86.8 | 86.6 | 25.0 |
| 32 | 117.1 | 116.8 | 24.7 | 96.4 | 96.8 | 25.4 | 94.7 | 94.6 | 24.9 | 86.9 | 86.8 | 24.9 |
| 32.5 | 116.8 | 116.8 | 25.4 | 96.5 | 96.8 | 25.3 | 94.4 | 94.4 | 25.0 | 86.7 | 86.9 | 25.2 |
| 33 | 117.0 | 117.0 | 25.0 | 96.7 | 96.8 | 25.1 | 94.3 | 94.5 | 25.2 | 87.6 | 87.0 | 24.4 |
| 33.5 | 117.7 | 117.0 | 24.3 | 96.8 | 96.9 | 25.3 | 95.1 | 94.5 | 24.4 | 87.4 | 87.0 | 24.6 |
| 34 | 117.4 | 117.1 | 24.7 | 96.9 | 96.8 | 24.9 | 94.3 | 94.3 | 25.0 | 87.2 | 87.0 | 24.8 |
| 34.5 | 116.9 | 117.4 | 25.8 | 97.0 | 96.7 | 24.6 | 94.3 | 94.4 | 25.1 | 87.0 | 87.0 | 25.0 |
| 35 | 117.3 | 117.1 | 24.8 | 97.1 | 96.9 | 24.8 | 94.4 | 94.3 | 24.9 | 88.4 | 87.2 | 23.8 |
| 35.5 | 116.9 | 117.1 | 25.2 | 97.2 | 96.9 | 24.7 | 94.2 | 94.3 | 25.1 | 87.5 | 87.2 | 24.7 |
| 36 | 116.6 | 116.8 | 25.2 | 96.8 | 96.9 | 25.1 | 94.1 | 94.6 | 25.5 | 87.0 | 87.3 | 25.3 |
| 36.5 | 116.6 | 116.9 | 25.3 | 96.9 | 97.1 | 25.2 | 94.7 | 94.6 | 24.9 | 87.2 | 87.3 | 25.1 |
| 37 | 117.0 | 117.3 | 25.3 | 97.2 | 97.1 | 24.9 | 95.4 | 94.7 | 24.3 | 88.6 | 87.6 | 24.0 |
| 37.5 | 116.8 | 117.3 | 25.5 | 97.1 | 97.1 | 25.0 | 95.3 | 94.7 | 24.4 | 88.7 | 87.6 | 23.9 |
| 38 | 116.5 | 117.1 | 25.6 | 97.0 | 97.1 | 25.1 | 95.6 | 94.9 | 24.2 | 87.8 | 87.8 | 24.8 |
| 38.5 | 117.4 | 117.4 | 25.0 | 96.9 | 97.1 | 25.2 | 95.3 | 94.9 | 24.6 | 87.5 | 87.7 | 25.2 |
| 39 | 117.2 | 117.4 | 25.2 | 97.1 | 97.1 | 25.0 | 95.4 | 94.9 | 24.4 | 88.6 | 87.7 | 24.1 |
| 39.5 | 117.4 | 117.6 | 25.2 | 97.1 | 97.1 | 25.0 | 95.7 | 95.2 | 24.5 | 87.9 | 87.7 | 24.8 |
| 40 | 117.6 | 117.5 | 25.0 | 97.1 | 97.2 | 25.1 | 95.6 | 95.2 | 24.6 | 88.0 | 87.9 | 24.9 |

CORELESS ROTATING ELECTRICAL MACHINE INCLUDING STATOR COMPRISING CYLINDRICAL COIL AND COOLING METHOD THEREFOR

TECHNICAL FIELD

The present invention relates to a coreless rotating electrical machine including a stator comprising a cylindrical coil and its cooling method.

More specifically, the present invention relates to a coreless rotating electrical machine comprising:

a stator having an energizeable coreless cylindrical coil formed of a cylindrical shape having a laminate structure configured by a plurality of conductive metal sheets with a plurality of linear parts being spaced in a longitudinal direction, in such a manner that each linear part of the conductive metal sheets is covered by an insulating layer, and a lid-type mount which fixes one of end faces of the cylindrical coil, and in which a drive shaft is rotatably coupled to a center part, and a rotor having a cup-type mount opposingly positioned with respect to the lid-type mount, having a bottom, an inner cylindrical air-channel forming body and an outer cylindrical air-channel forming body, and in which the drive shaft rotatably coupled to the lid-type mount is coupled and fixed to a center part, and a plurality of magnets equipped on an inner surface of the outer cylindrical air-channel forming body and/or an outer surface of the inner cylindrical air-channel forming body, wherein the cup-type mount has a first air space which forms an air gap formed by the bottom, the inner cylindrical air-channel forming body and the outer cylindrical air-channel forming body, the cylindrical coil is arranged in the air gap as suspended such that another end face of the cylindrical coil leaves a clearance between the bottom of the cup-type mount, with a plurality of the exposed magnets; a second air space positioned in an inner side of the cylindrical coil; and a third air space positioned in an outer side of the cylindrical coil between open end faces of the cup-type mount and the lid-type mount, in which, the cup-type mount has intake holes leading to the second air space on the bottom and a plurality of exhaust holes leading to the air gap, positioned in a row around a circumference of the outer cylindrical air-channel forming body, close to the bottom, and/or a plurality of exhaust holes leading to the air gap, consisting of arrays in a lengthwise direction of the air gap, from the open end face to the bottom with equally spaced intervals on the circumference of the outer cylindrical air-channel forming body, wherein ambient air taken into the second air space and/or ambient air taken into the outer side of the cylindrical coil, under differential pressure generated around the rotor by rotation thereof, are configured to directly cool a plurality of the magnets exposed in the air gap and both surfaces of the cylindrical coil arranged in the air gap, and to be discharged from the exhaust holes of the rotating outer cylindrical air-channel forming body and its cooling method.

BACKGROUND ART

An electric motor is a device which converts electrical energy to kinetic energy. An electric motor may be generally classified as DC motor or AC motor, inner-rotor type or outer-rotor type based on positional relationship of a stator and a rotor, and winding-field type or permanent-magnet type. Either classification includes an electric motor which utilizes so-called revolving-field, in which a stator revolves field direction to influence a rotor to rotate.

In a revolving-field motor constructed with a stator including a cylindrical coil cylindrically formed by windings and a rotor sandwiching the cylindrical coil and forming air gap, it is well-known that heat is generated by resistance (copper loss) of the cylindrical coil consisting of windings, eddy current at an inner yoke and an outer yoke of a conductor forming the cylindrical coil consisting of windings and the air gap, and hysteresis of an iron core. It is also well-known that copper loss or hysteresis loss which converts magnetic energy to thermal energy is an inevitable technical problem.

To address influence to output and/or efficiency of an electric motor induced by the above technical problem and heat-induced deterioration of coercive force of permanent magnets equipped on an outer surface of an inner yoke and/or on an inner surface of an outer yoke which configure a rotor, it has been attempted to cool coiled surface consisting of windings, such as by feeding cooling air and/or taking in ambient air inside the electric motor, but it does not yet lead to fundamental solution. It is because there are limitations in using a coil or cylindrical coil consisting of windings turned for a number of layers. For example, it is because even if ambient air is taken in to be flowed through a surface of the coil consisting of windings turned for a number of layers, it is technically impossible to feed the cooling air so as to be reached inside of the coil consisting of windings which has heat accumulated.

The present invention relates to a coreless rotating electrical machine which is developed in challenging such technical problem. More specifically, it is characterized in that the present invention is a coreless rotating electrical machine which uses an energizeable coreless cylindrical coil formed of a cylindrical shape having a laminate structure consisting of conductive metal sheets with a plurality of linear parts being spaced in a longitudinal direction, in such a manner that each linear part of the conductive sheets is covered by an insulating layer. In fact, thickness of the laminate structure consisting of two-layer or four-layer conductive metal sheets is only 5 mm, and if both surfaces of a cylindrical coil consisting of such conductive metal sheet laminate can be directly cooled, heat generation control of the coil is possible. The present invention is developed focusing attention on such respect.

Also the present invention relates to a coreless rotating electrical machine configured as comprising, a stator having a cylindrical coil consisting of such laminate of conductive metal sheets, and a lid-type mount which fixes one of end faces of the cylindrical coil; and a rotor having a cup-type mount opposingly positioned with respect to the lid-type mount of the corresponding rotor, with an air gap formed by a bottom, an inner cylindrical air-channel forming body and an outer cylindrical air-channel forming body, in which the cylindrical coil is arranged, and a plurality of magnets equipped on the outer cylindrical air-channel forming body and/or the inner cylindrical air-channel forming body, and a second air space positioned in an inner side and a third air space positioned in an outer side, of the cylindrical coil are formed between open end faces of the cup-type mount and the lid-type mount, wherein the cup-type mount has intake holes leading to the second air space on the bottom and a plurality of exhaust holes leading to the air gap, positioned in a row around a circumference of the outer cylindrical air-channel forming body, close to the bottom and/or a plurality of exhaust holes leading to the air gap, consisting of arrays in a lengthwise direction of the air gap, from the open end face to the bottom on the circumference of the outer cylindrical air-channel forming body with equally spaced intervals.

The coreless rotating electrical machine of the present invention and its cooling method has features as in the followings. Specifically, when the cylindrical coil is energized, the rotor is operated. Differential pressure is generated around the rotor by rotation thereof. With such differential pressure, ambient air is taken into the second air space via the intake holes. At the same time, ambient air is taken into the outer side of the cylindrical coil in the air gap also from the third air space. The ambient air taken into the second air space flows through the inner side of the cylindrical coil arranged in the air gap to cool an inner surface of the cylindrical coil. Similarly, the ambient air taken into the outer side of the cylindrical coil flows through the outer side of the cylindrical coil to cool an outer surface of the cylindrical coil. As a result, the ambient air which has taken therein directly cools a plurality of the magnets exposed in the air gap and both surfaces of the cylindrical coil arranged in the air gap, and the ambient air which has flowed therethrough is discharged from exhaust holes of the rotating outer cylindrical air-channel forming body.

Patent Document 1 (Japanese Laid-Open Patent Publication 2012-016218A) or Patent Document 2 (Japanese Laid-Open Patent Publication 2012-030786A) describes a wheel-in motor using an energizable coreless cylindrical coil. First, Patent Document 1 does not at all describe for cooling heat generated when an electric motor is operated. Also, it is not what considers such respect. On the other hand, Patent Document 2 describes as that, a braking means fixed to an inner yoke in a space formed in an inner surface of the inner yoke of a rotor is further included, and shows a vent hole for communicating the space formed in the inner surface of the inner yoke with ambient air by opening an end face of a wheel fixed to an outer yoke to a stator, and thus, ambient air is taken in from the vent hole to allow for cooling inside of a wheel-in motor, but it is considered that it is for making frictional heat caused by the braking means escape. Both of them are related to the wheel-in motor which has no relationship with the coreless rotating electrical machine of the present invention and its cooling method.

Patent Document 3 (Japanese Patent No. 2,657,192B) describes a linear DC brushless motor, wherein an air supply channel is drilled in a fixed armature, and is "configured to directly blow air from the air supply channel to the armature coil to cool the armature coil as well as to cool a stator yoke itself with respect to a magnet yoke". However, as described in the above, since it is configured by a plurality of stator yokes attached in parallel to a printed wiring board in moving direction of a slider, with an air-core coil, formed by winding a lead wire for a number of layers, cooling air cannot be blown into interior of the coil formed by winding a lead wire for a number of layers even by directly blowing air to the armature coil. This is obviously not a revolving-field motor which is the subject of the invention.

Patent Document 4 (Japanese Laid-Open Patent Publication 2006-246678A) describes an outer-rotor type wheel-in motor. The electric motor is a SR motor configured with 6 salient poles on a stator side and 4 salient poles on a rotor side provided on a hollow shaft, and Patent Document 4 describes a cooling method for a coil formed by winding a lead wire for a number of layers which is mounted on the 6 salient poles on the stator side in the SR motor. In the cooling method, an inflow channel and an exhaust channel are provided in the hollow shaft via a bulkhead, air is flowed through on a coil surface, and then discharged outside of a stator, and since the air flows only on an exposed surface of the lead wire which is wound for a number of layers, heat accumulated inside the coil formed by winding a lead wire cannot be cooled.

Patent Document 5 (Japanese Patent No. 3,494,056B) describes an outer rotor type magnetic generator configured by a stator with a coil, formed by winding a lead wire for a number of layers, wound around an annular stator core and a rotor consisting of an outer yoke with permanent magnets being supported on an inner surface of a cylindrical part which covers an outer periphery of the stator. There is described a cooling method in which, in the electric motor, a vent hole is provided on a plate which supports the stator rotatably coupled to the rotating shaft, the vent hole on the plate is communicated with a vent hole provided on a bottom of a rotor for cooling a surface of a coil, formed by winding a lead wire for a number of layers, wound around a stator core and the permanent magnets, the rotor is rotated so that air is taken in from the vent hole on the plate and is discharged from the vent hole of the rotor, and the discharged air is further blown to the cylindrical part of the rotor for cooling the surface of the coil and the permanent magnets. In addition, there is described that cooling air is drawn from outside to a rotor yoke, and the cooling air is blown to an outer periphery of the rotor yoke to allow for improving cooling effect to magnets arranged inside of the rotor yoke. However, heat accumulated inside the coil formed by winding a lead wire for a number of layers cannot be cooled even with such outer rotor type magnetic generator.

Patent Document 6 (Japanese Laid-Open Utility Model Publication H5-022133A) describes a method for forcibly cooling interior of an outer rotor type wheel-in motor for an electric vehicle, and a coil used for the electric motor is a coil formed by winding a lead wire for a number of layers, similar to what are described in Cited References 3 to 5, and heat accumulated inside the coil cannot be cooled even if cooling air is fed by a cooling fan.

Patent Document 7 (Japanese Patent No. 2,831,348B) describes an electromagnetic conversion machine configured to supply cooling gas medium into a housing, but the supplying of cooling gas medium into the housing is forcibly performed by a blower. It is described that, in the housing, a rotor is rotated with respect to an armature which forms a coil body. The armature is formed by winding a lead wire, which is covered by an insulating material, for a number of times, and heat accumulated inside the armature cannot be cooled even if cooling air is fed therein.

Patent Document 8 (Japanese Patent No. 3,704,044B) describes a blushless motor using an energizable coreless cylindrical coil formed of a cylindrical shape having a laminate structure consisting of conductive metal sheets with a plurality of linear parts being spaced in a longitudinal direction, in such a manner that each linear part of the conductive metal sheets is covered by an insulating layer, but a cylindrical coil arranged as suspended in an air gap and/or a method or means for cooling a plurality of exposed magnets are not at all considered, and there is no description regarding such respects. It relates to the blushless motor which has no relationship with the coreless rotating electrical machine of the present invention and its cooling method.

CITATION LIST

Patent Documents

Patent Document 1: Japanese Laid-Open Patent Publication 2012-016218A
Patent Document 2: Japanese Laid-Open Patent Publication 2012-030786A Patent Document 3: Japanese Patent No. 2,657,192B Patent Document 4: Japanese Laid-Open Patent Publication 2006-246678A Patent Document 5: Japanese Patent No. 3,494,056B Patent Document 6: Japanese Laid-Open Utility Model Publication H5-022133A Patent Document 7: Japanese Patent No. 2,831,348B Patent Document 8: Japanese Patent No. 3,704,044B Non-Patent Documents Non-Patent Document 1: "Best Colored Illustration, All of Current Motor Technology", Edited by Kan Akatsu, Natsume Publishing Planning Co., Ltd. (Published on Jul. 20, 2013)

SUMMARY OF INVENTION

Technical Problem

SUMMARY OF INVENTION

Technical Problem

Temperature rise inside a motor due to heat generation induced by copper loss of a cylindrical coil and eddy current generated in a conductor in a coreless rotating electrical machine configured with a stator including a cylindrical coil and a rotor forming an air gap where the cylindrical coil is arranged deteriorates efficiency η of a coreless rotating electrical machine and is recognized as an inevitable technical problem inherent in the coreless rotating electrical machine. Various proposals have been made to address the problem but have not led to fundamental solution. The inventors of the present invention have challenged the technical problem and developed a coreless rotating electrical machine comprising a stator including a cylindrical coil of the present invention.

Solution to Problem

The technical problem of the present invention may be solved by configuring a coreless rotating electrical machine as comprising a stator having a cylindrical coil consisting of a laminate of two-layer or four-layer conductive metal sheets and a lid-type mount which fixes one of end faces of the cylindrical coil, and a rotor having a cup-type mount opposingly positioned with respect to the lid-type mount of the corresponding rotor, with an air gap formed by a bottom, an inner cylindrical air-channel forming body and an outer cylindrical air-channel forming body, in which the cylindrical coil is arranged, and a plurality of magnets equipped on the outer cylindrical air-channel forming body and/or the inner cylindrical air-channel forming body, and a second air space positioned in an inner side and a third air space positioned in an outer side, of the cylindrical coil are formed between open end faces of the cup-type mount and the lid-type mount, wherein the cup-type mount has intake holes leading to the second air space on the bottom and a plurality of exhaust holes leading to the air gap, positioned around a circumference of the outer cylindrical air-channel forming body with equally spaced intervals, close to the bottom and/or a plurality of exhaust holes leading to the air gap, consisting of arrays in a lengthwise direction of the air gap, from the open end face to the bottom on the circumference of the outer cylindrical air-channel forming body with equally spaced intervals.

The coreless rotating electrical machine of the present invention and its cooling method have features as in the followings. Specifically, when the cylindrical coil is energized, a rotor is operated. Differential pressure is generated around the rotor by rotation thereof. With such differential pressure, ambient air is taken into the second air space via intake holes. At the same time, ambient air is taken into the outer side of the cylindrical coil in the air gap from the third air space. On the other hand, the differential pressure around the rotor makes the ambient air taken into the second air space flow through the inner side of the cylindrical coil arranged in the air gap to cool an inner surface of the cylindrical coil. Also, it makes the ambient air taken into the outer side of the cylindrical coil flow through the outer side of the cylindrical coil to cool an outer surface of the cylindrical coil. As a result, the ambient air taken into the second air space and the air gap directly cools a plurality of magnets exposed in the air gap and both surfaces of the cylindrical coil arranged in the air gap, and the ambient air flowed through the air gap is discharged from exhaust holes of a rotating outer cylindrical air-channel forming body.

What is interesting from a technical perspective is an operation of the third air space. As apparent from experiment results described in the followings, when the coreless rotating electrical machine having a rotor without any exhaust holes around the circumference of the outer cylindrical air-channel forming body, the third air space acts as an exhaust hole. Specifically, it is because the ambient air taken into the second air space from the intake holes at the bottom of the cup-type mount under the differential pressure around the rotor flows through the inner side of the cylindrical coil arranged in the air gap and then to outer side thereof and discharged from the third air space.

However, if exhaust holes connecting to the air gap are provided on the circumference of the outer cylindrical air-channel forming body, nothing is different in that the differential pressure around the rotor takes the ambient air into the second air space via the intake holes, however, at the same time, the third air space turns to act at as an intake hole, and the ambient air taken in thereby is taken into the air gap and discharged from the exhaust holes leading to the air gap.

A first aspect of the present invention, as shown in FIG. 1 and FIG. 2(a), relates to a coreless rotating electrical machine 10 comprising:

a stator 2 having an energizeable coreless cylindrical coil 200 formed of a cylindrical shape having a laminate structure configured by a plurality of conductive metal sheets with a plurality of linear parts being spaced in a longitudinal direction, in such a manner that each linear part of the conductive metal sheets is covered by an insulating layer, and a lid-type mount 300 which fixes one of end faces 201 of the cylindrical coil 200, and in which a drive shaft 100 is rotatably coupled to a center part 310, and a rotor 3 having a cup-type mount 400 opposingly positioned with respect to the lid-type mount 300, having a bottom 420, an inner cylindrical air-channel forming body 500 and an outer cylindrical air-channel forming body 600, and in which the drive shaft 100 rotatably coupled to the lid-type mount 300 is coupled and fixed to a center part 410, and a plurality of magnets 4 equipped on an inner surface of the outer cylindrical air-channel forming body 600 and/or an outer surface of the inner cylindrical air-channel forming body 500, wherein the cup-type mount 400 has a first air space 40 which forms an air gap formed by the bottom 420, the inner cylindrical air-channel forming body 500 and the outer cylindrical air-channel forming body 600, the cylindrical coil 200 is arranged in the air gap 40 as suspended such that another end face 202 of the cylindrical coil 200 leaves a clearance between the bottom 420, with a plurality of the exposed magnets 4; a second air space 20 positioned in an inner side 210 of the cylindrical coil 200; and a third air space 30 positioned in an outer side 220 of the cylindrical coil 200 between open end faces 530, 630 of the cup-type mount 400 and the lid-type mount 300, characterized in that, the cup-type mount 400 has intake holes 430 leading to the second air space 20 on the bottom 420 and a plurality of exhaust holes 660 leading to the air gap 40, positioned in a row around a circumference 610 of the outer cylindrical air-channel forming body 600, close to the bottom 420, wherein ambient air 70 taken into the second air space 20 via the intake holes 430 and ambient air 80 taken into the air gap via the third air space 30, under differential pressure generated around the rotor 3 by rotation thereof, are configured to flow through inside the air gap 40 to directly cool a plurality of the magnets 4 exposed in the air gap 40 and both surfaces 210, 220 of the cylindrical coil 200 arranged in the air gap 40 and to be discharged via the exhaust holes 660.

As apparent from the first aspect of the present invention, the coreless rotating electrical machine 10 is characterized in that it takes the ambient air 70 into the second air space 20 via the intake holes 430, and at the same time, the ambient air 80 is taken into the air gap 40 from the third air space 30, under the differential pressure generated around the rotor 3 by rotation thereof, the differential pressure generated around the rotor makes the ambient air 70 taken into the second air space 20 flow through the inner side 210 of the cylindrical coil 200 arranged in the air gap 40, and makes the ambient air 80 taken into the air gap 40 flow through the outer side 220 of the cylindrical coil 200 to have a plurality of the magnets 4 exposed in the air gap 40 and both surfaces 210, 220 of the cylindrical coil 200 arranged in the air gap 40 cooled, and then, finally have them discharged via the exhaust holes 660.

A second aspect of the present invention, as shown in FIG. 1 and FIG. 2(b), relates to a coreless rotating electrical machine 10 comprising:

a stator 2 having an energizeable coreless cylindrical coil 200 formed of a cylindrical shape having a laminate structure configured by a plurality of conductive metal sheets with a plurality of linear parts being spaced in a longitudinal direction, in such a manner that each linear part of the conductive metal sheets is covered by an insulating layer, and a lid-type mount 300 which fixes one of end faces 201 of the cylindrical coil 200, and in which a drive shaft 100 is rotatably coupled to a center part 310, and a rotor 3 having a cup-type mount 400 opposingly positioned with respect to the lid-type mount 300, having a bottom 420, an inner cylindrical air-channel forming body 500 and an outer cylindrical air-channel forming body 600, and in which the drive shaft 100 rotatably coupled to the lid-type mount 300 is coupled and fixed to a center part 410, and a plurality of magnets 4 equipped on an inner surface of the outer cylindrical air-channel forming body 600 and/or an outer surface of the inner cylindrical air-channel forming body 500, wherein the cup-type mount 400 has a first air space 40 which forms an air gap 40 formed by the bottom 420, the inner cylindrical air-channel forming body 500 and the outer cylindrical air-channel forming body 600, the cylindrical coil 200 is arranged in the air gap 40 as suspended such that another end face 202 of the cylindrical coil 200 leaves a clearance between the bottom 420, with a plurality of the exposed magnets 4; a second air space 20 positioned in an inner side 210 of the cylindrical coil 200; and a third air space 30 positioned in an outer side 220 of the cylindrical coil 200 between open end faces 530, 630 of the cup-type mount 400 and the lid-type mount 300, characterized in that, the cup-type mount 400 has intake holes 430 leading to the second air space 20 on the bottom 420 and a plurality of exhaust holes 680 leading to the air gap 40, consisting of arrays 670 in a lengthwise direction of the air gap 40, from the open end face 630 to the bottom 420 with equally spaced intervals on the circumference 610 of the outer cylindrical air-channel forming body 600, wherein ambient air 70 taken into the second air space 20 via the intake holes 430 and ambient air 80 taken into the air gap 40 via the third air space 30, under differential pressure generated around the rotor 3 by rotation thereof, are configured to flow through inside the air gap 40 to directly cool a plurality of the magnets 4 exposed in the air gap 40 and both surfaces of the cylindrical coil 200 arranged in the air gap 40, and to be discharged via the exhaust holes 680.

As apparent from the second aspect of the present invention, the coreless rotating electrical machine 10 is characterized in that it takes the ambient air 70 into the second air space 20 via the intake holes 430, and at the same time, the ambient air 80 is taken into the air gap 40 from the third air space 30, under differential pressure generated around the rotor 3 by rotation thereof, the differential pressure generated around the rotor makes the ambient air 70 taken into the second air space 20 flow through the inner side 210 of the cylindrical coil 200 arranged in the air gap 40 to cool the inner side 210 of the cylindrical coil 200, and on the other hand, makes the ambient air 80 taken into the air gap 40 flow through the outer side 220 of the cylindrical coil 200 to have the outer side of the cylindrical coil 200 cooled. At the same time, the ambient air being flowed through also cools a plurality of the magnets 4 exposed in the air gap 40, and the ambient air is finally discharged from the continuous exhaust holes 680 provided on the circumference from the open end face 630 to the bottom 420 with equally spaced intervals.

A third aspect of the present invention, as shown in FIG. 1 and FIG. 2(c), relates to a coreless rotating electrical machine 10 comprising:

a stator 2 having an energizeable coreless cylindrical coil 200 formed of a cylindrical shape having a laminate structure configured by a plurality of conductive metal sheets with a plurality of linear parts being spaced in a longitudinal direction, in such a manner that each linear part of the conductive metal sheets is covered by an insulating layer, and a lid-type mount 300 which fixes one of end faces 201 of the cylindrical coil 200, and in which a drive shaft 100 is rotatably coupled to a center part 310, and a rotor 3 having a cup-type mount 400 opposingly positioned with respect to the lid-type mount 300, having a bottom 420, an inner cylindrical air-channel forming body 500 and an outer cylindrical air-channel forming body 600, and in which the drive shaft 100 rotatably coupled to the lid-type mount 300 is coupled and fixed to a center part 410, and a plurality of magnets 4 equipped on an inner surface of the outer cylindrical air-channel forming body 600 and/or an outer surface of the inner cylindrical air-channel forming body 500, wherein the cup-type mount 400 has a first air space 40 which forms an air gap formed by the bottom 420, the inner cylindrical air-channel forming body 500 and the outer cylindrical air-channel forming body 600, the cylindrical coil 200 is arranged in the air gap 40 as suspended such that another end face 202 of the cylindrical coil 200 leaves a clearance between the bottom 420, with a plurality of the exposed magnets 4; a second air space 20 positioned in an inner side 210 of the cylindrical coil 200; and a third air space 30 positioned in an outer side 220 of the cylindrical coil 200 between open end faces 530, 630 of the cup-type mount 400 and the lid-type mount 300, characterized in that, the cup-type mount 400 has intake holes 430 leading to the second air space 20 on the bottom 420 and a plurality of first exhaust holes 660 leading to the air gap 40, positioned in a row around a circumference 610 of the outer cylindrical air-channel forming body 600, close to the bottom 420, and a plurality of second exhaust holes 680 leading to the air gap 40, consisting of arrays 670, in a lengthwise direction of the air gap 40, from the open end face 630 to the bottom 420 with equally spaced intervals on the circumference 610 of the outer cylindrical air-channel forming body 600, wherein ambient air 70 taken into the second air space 20 via the intake holes 430 and ambient air 80 taken into the air gap 40 via the third air space 30, under differential pressure generated around the rotor 3 by rotation thereof, are configured to flow through inside the air gap 40 to directly cool a plurality of the magnets 4 exposed in the air gap 40 and both surfaces 210, 220 of the cylindrical coil 200 arranged in the air gap 40, and to be discharged via the first exhaust holes 660 and the second exhaust holes 680.

As apparent from the third aspect, the coreless rotating electrical machine 10 is characterized in that it takes the ambient air 70 into the second air space 20 via the intake holes 430, and at the same time, the ambient air 80 is taken into the air gap 40 from the third air space 30, under differential pressure generated around the rotor 3 by rotation thereof, differential pressure generated around the rotor makes the ambient air 70 taken into the second air space 20 flow through the inner side 210 of the cylindrical coil 200 arranged in the air gap 40, and makes ambient air 80 taken into the air gap 40 flow through the outer side 220 of the cylindrical coil 200 to have a plurality of the magnets 4 exposed in the air gap 40 and both surfaces 210, 220 of the cylindrical coil 200 cooled, and then finally have them discharged from the first exhaust holes 660 and the second exhaust holes 680.

BRIEF DESCRIPTION OF DRAWINGS

FIG. 6 is a measurement data table, for rotational speed 2000 rpm, of the measurement experiment for evaluating cooling effect.

FIG. 7 is a measurement data table, for rotational speed 4000 rpm, of the measurement experiment for evaluating cooling effect.

FIG. 8 is a measurement data table, for rotational speed 6000 rpm, of the measurement experiment for evaluating cooling effect.

EMBODIMENTS

Generated torque T (N·m), one of performance indications of a rotating electrical machine, is proportional to current intensity I (A) flowing in an armature coil and an output P (W) is calculated as a product of the torque T (N·m) and a rotation angular speed ω (rad/s). On the other hand, for voltage drop, a power source voltage (V) equals to a sum of a product of the current I (A) flowing in the armature coil and a resistance R (Ω) of the armature coil, and a counter electromotive force $E_0$ (V) which is induced electromotive force.

$$T = Kt \times 1 \tag{1}$$

$$P = T \times \omega \tag{2}$$

$$V = IR + E_0 \tag{3}$$

From the above equations, it is found as important to reduce the coil resistance in order to increase torque and output.

Figure 1:
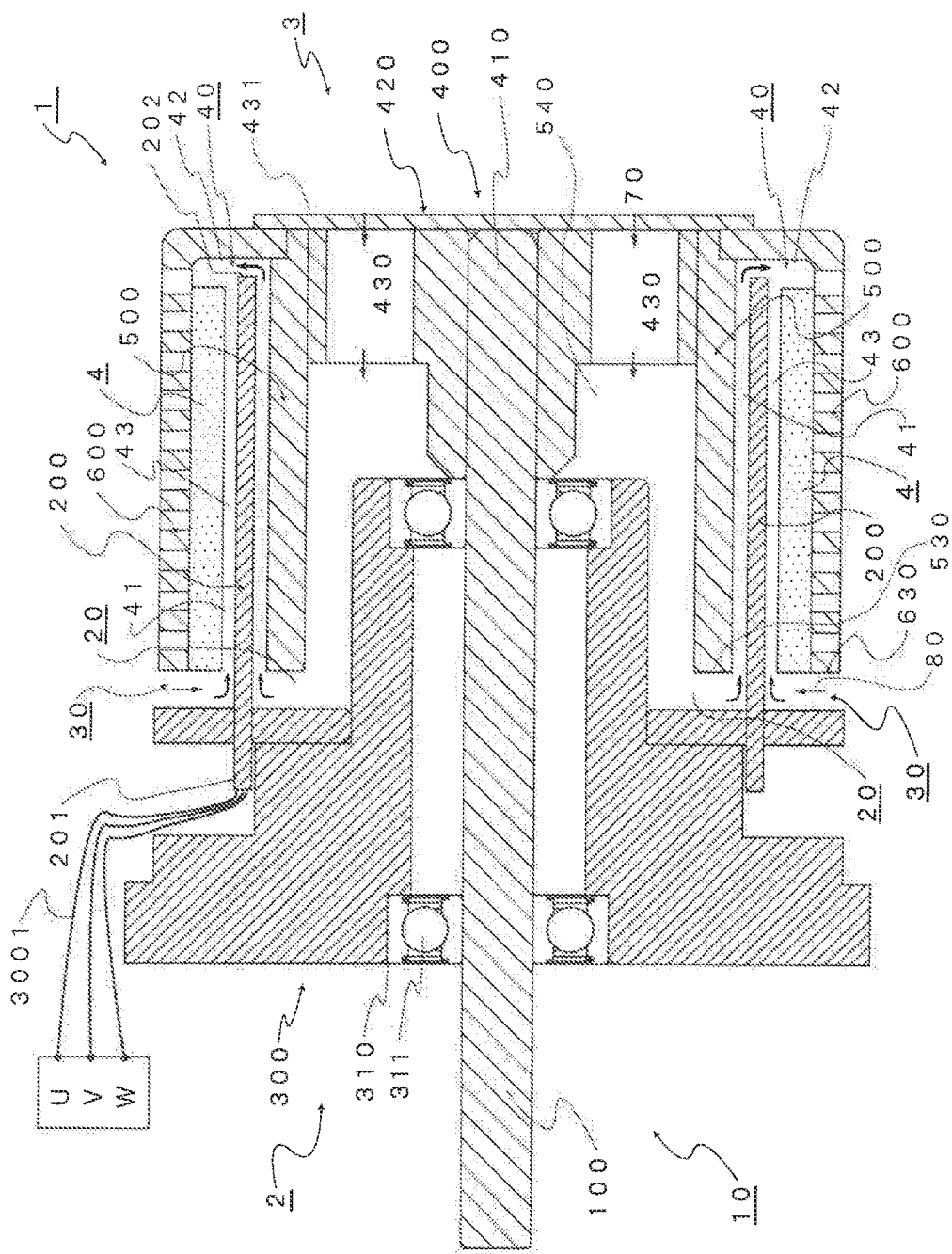
FIG. 1 is a schematic diagram showing a cross sectional view of a coreless rotating electrical machine comprising a stator including a cylindrical coil, which is one embodiment of the present invention.
Figure 2:
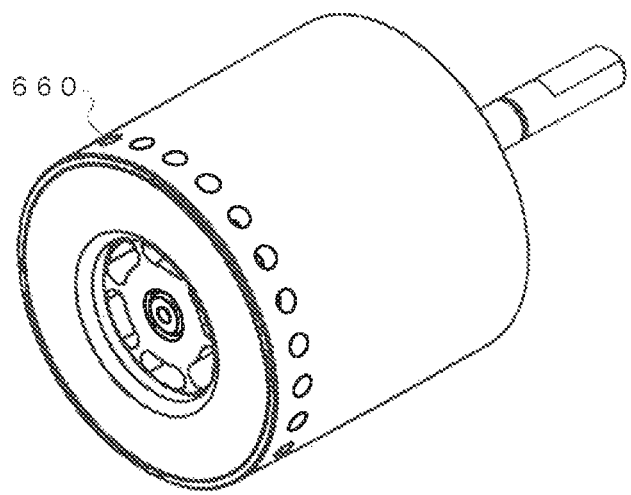
FIG. 2 is a schematic diagram 2(*a*), 2(*b*) and 2(*c*), respectively showing a position of exhaust holes leading to an air gap comprised in an outer rotor which configures a cup-type mount shown in FIG. 1
Figure 2:
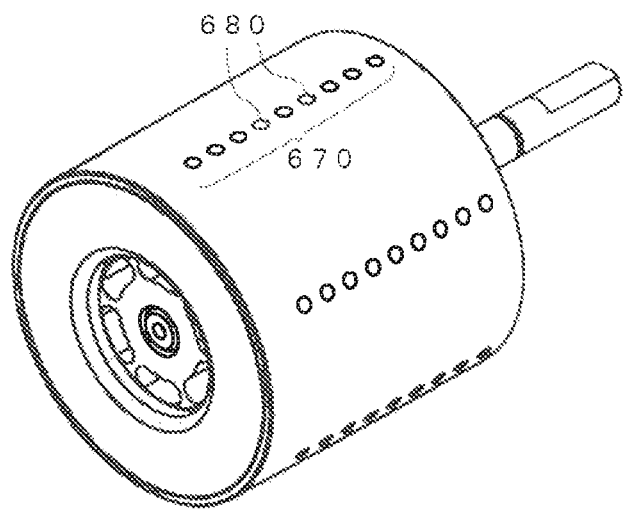
Figure 2:
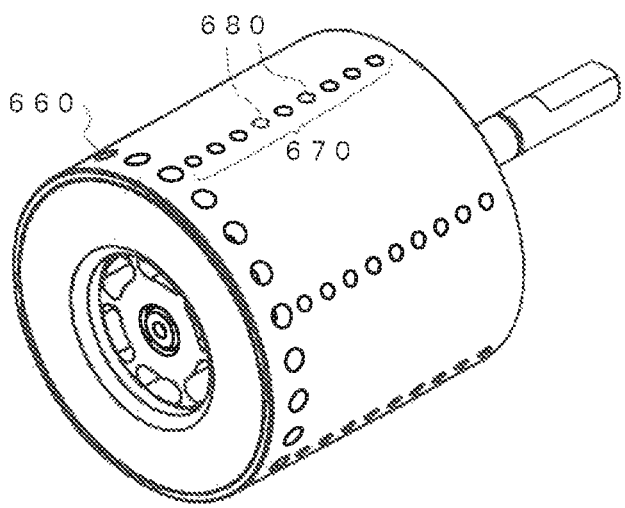

In this regard, a basic structure of a coreless rotating electrical machine 10 comprising a stator 2 including a cylindrical coil 200 which characterizes the present invention as shown in FIGS. 1 and 2 (hereinafter referred as "an electric motor 10 of the present invention") is overviewed. A first feature of the basic structure is that the electric motor of the present invention uses a cylindrical coil 200 formed using a laminate structure consisting of a few of conductive metal sheets as an energizeable coil body which configures a stationary armature 2. As the cylindrical coil 200 and a manufacturing method thereof, as described for example in Patent Document 8, the cylindrical coil 200 is an energizeable coreless cylindrical coil formed of a cylindrical shape having a laminate structure configured by a plurality of conductive metal sheets with a plurality of linear parts being spaced in a longitudinal direction, in such a manner that each linear part of the conductive metal sheets is covered by an insulating layer, and preferably has a certain rigidity with a thickness, consisting of two layers or four layers, of 5 mm or less.

A second feature of the basic structure is that the electric motor of the present invention has a structure as that one end face 201 of the cylindrical coil 200 is closed by an inner surface of a lid-type mount 300 which configures a stator 2, and the other open end face 202 of the cylindrical coil 200 is inserted as suspended in a first air space 40 which forms an air gap in which a magnetic field with a donut-shape cross section is formed by an outer cylindrical air-channel forming body 600 and an inner cylindrical air-channel forming body 500 which configure a rotor 3 and consisting of a magnetic body where a bottom 420 of a cup-type mount 400 and a plurality of magnets (permanent magnets) 4, are equipped (as one embodiment of these, hereinafter, an outer cylindrical air-channel forming body is referred as "an outer yoke 600" and an inner cylindrical air-channel forming body is referred as "an inner yoke 500").

More in detail, the cylindrical coil 200 inserted into the air gap 40 is arranged as suspended in the air gap 40 with a little clearance such that the inner surface 210 and the outer surface 220 of the cylindrical coil 200 do not contact with an inner surface 610 of the outer yoke 600 and the outer surface 520 of the inner yoke 500 of the rotor 3 and the other end face 202 of the cylindrical coil do not contact with the bottom 420 of the cup-type mount 400 which configures the rotor 3. In this regard, the electric motor of the present invention has a structure that the stator 2 and the rotor 3 are arranged on a driveshaft 100 so that the cylindrical coil 200 is arranged as such.

A third feature of the basic structure is that the electric motor of the present invention has a structure that a second air space 20 and a third air space 30 are formed by the stator 2, the cylindrical coil 200 and the rotor 3. More in detail, the second air space 20 is formed, between the open end face of the outer yoke and the inner yoke integrated with the rotor 3 and the inner surface of the stator 2 which opposes to the end face, on an inner surface 210 of the cylindrical coil closed by the inner surface of the stator 2, and naturally, is in communication with the air gap 40.

When the electric motor 10 of the present invention having the rotor 3 in which the intake holes 430 are provided on the bottom 420 of the cup-type mount 400 which configures the rotor 3 is activated, ambient air 70 is taken into the second air space 20 from the intake holes 430 under differential pressure generated around the rotor 3 by rotation thereof. In addition, the third air space 30 is formed between the air gap 40 and ambient air on the outer surface 220 of the cylindrical coil closed by the inner surface of the stator 2. Thus, the second air space 20 which is a closed space formed by the inner surface 210 of the cylindrical coil 200 and the inner surface of the stator 2 is in communication with the air gap 40, and can be communicated only with the third air space 30 which is an open space formed by the outer surface 220 of the cylindrical coil 200, the inner surface of the stator 2 and the open end of the outer yoke 600 via the inner surface of the rotor 3.

By the way, if the electric motor 10 of the present invention is configured as what does not have any exhaust holes leading to the air gap on the outer cylindrical air-channel forming body, ambient air taken into the second air space via the intake holes under differential pressure generated around the rotor 3 flows through the inner surface 210 of the cylindrical coil 200 and discharged from the third air space via the outer surface 230. That is, it is because the intake holes 430 become an inlet, and the third air space becomes an outlet of ambient air. However, the electric motor 10 of the present invention is provided with the exhaust holes 660, 680 leading to the air gap on the outer cylindrical air-channel forming body 600. Then, nothing is different in that the ambient air 70 is taken into the second air space 20 from the intake holes 430 under differential pressure generated around the rotor 3, however, at the same time, the third air space 30 turns to act as an intake hole, the ambient air 80 is separately taken in from the third air space 30, and the ambient air 80 took therein is taken to the air gap 40 and discharged from a plurality of exhaust holes 660, 680 leading to the air gap 40.

With the electronic motor 10 of the present invention, negative pressure is created in the second air space 20 under differential pressure generated around the rotor 3 by rotation thereof. By taking the ambient air 70 into the second air space 20, the ambient air 70 taken into the second air space 20 reaches the outer surface 220 by way of the inner surface 210 of the cylindrical coil 200 when passing through the air gap 40 where a magnetic field is formed. The electric motor 10 of the present invention is provided with a plurality of exhaust holes 660, 680 leading to the air gap 40 of the outer surface of the cylindrical air-channel forming body 600. The ambient air 70 taken into the second air space 20 is discharged from a plurality of the exhaust holes 660, 680 under differential pressure around the rotor 3. Negative pressure is created thereby in the air gap 40 of the outer surface 220 of the cylindrical coil 200. With such negative pressure, the ambient air 80 is separately taken in from the third air space, and discharged from a plurality of the exhaust holes 660, 680 similarly. Then, the ambient air 70, 80 which are taken in directly cool both surfaces 210, 220 of the cylindrical coil 200 of a laminate structure configured by a plurality of conductive metal sheets with a thickness of 5 mm or less, and may be discharged from a plurality of the exhaust holes 660, 680 leading to the air gap of the outer yoke 600.

It is clear that the electric motor 10 of the present invention has an innovative technical feature as that the higher the rotational speed of the rotor 3, i.e. the higher the output W, the higher the differential pressure around the rotor 3 and so is the cooling effect. This is derived from the basic structure of the electric motor 10 of the present invention described in the above. That is, it is derived from the feature of the electric motor having a structure where a cylindrical coil 200, the cylindrical coil being a coreless coil without any iron loss which increases as rotational speed increases and having rigidity as formed with a laminate structure of very thin metal sheets with a thickness of 5 mm or less, is inserted in a suspended state, in a narrow air gap 40 with large magnetic flux density, and the inner surface 210 of the cylindrical coil 200 arranged in the air gap 40 is cooled by the ambient air 70 taken into the second air space 20 in a closed space and discharged from a plurality of the exhaust holes 660, 680 provided in the outer yoke 600, and on the other hand, the ambient air 80 is separately taken into the air gap 40 by negative pressure created at such time via the third air space to cool the outer surface 220 of the cylindrical coil 220.

[Measurement Experiment for Evaluating Cooling Effect by Exhaust Holes]

In order to evaluate cooling effect of a rotating electrical machine 10 according to the present invention, measurement experiments for comparing levels of coil temperature increase for the following four patterns are performed:
(1) when Hr and Hr are both closed (comparative example)
(2) when Hr is open and Hs is closed (the first aspect of the present invention)
(3) when Hr is closed and Hs is open (the second aspect of the present invention)
(4) when Hr and Hr are both open (the third aspect of the present invention) with the first exhaust holes Hr (660) positioned in a row around a circumference of the outer yoke 600, close to the bottom 420, and the second exhaust holes Hs (680) consisting of arrays 670, in a lengthwise direction of the air gap 40, from the open end face 630 to the bottom 420 of the outer yoke 600 with equally spaced intervals on the circumference, provided on the rotating electrical machine as a measured motor.

Figure 3:
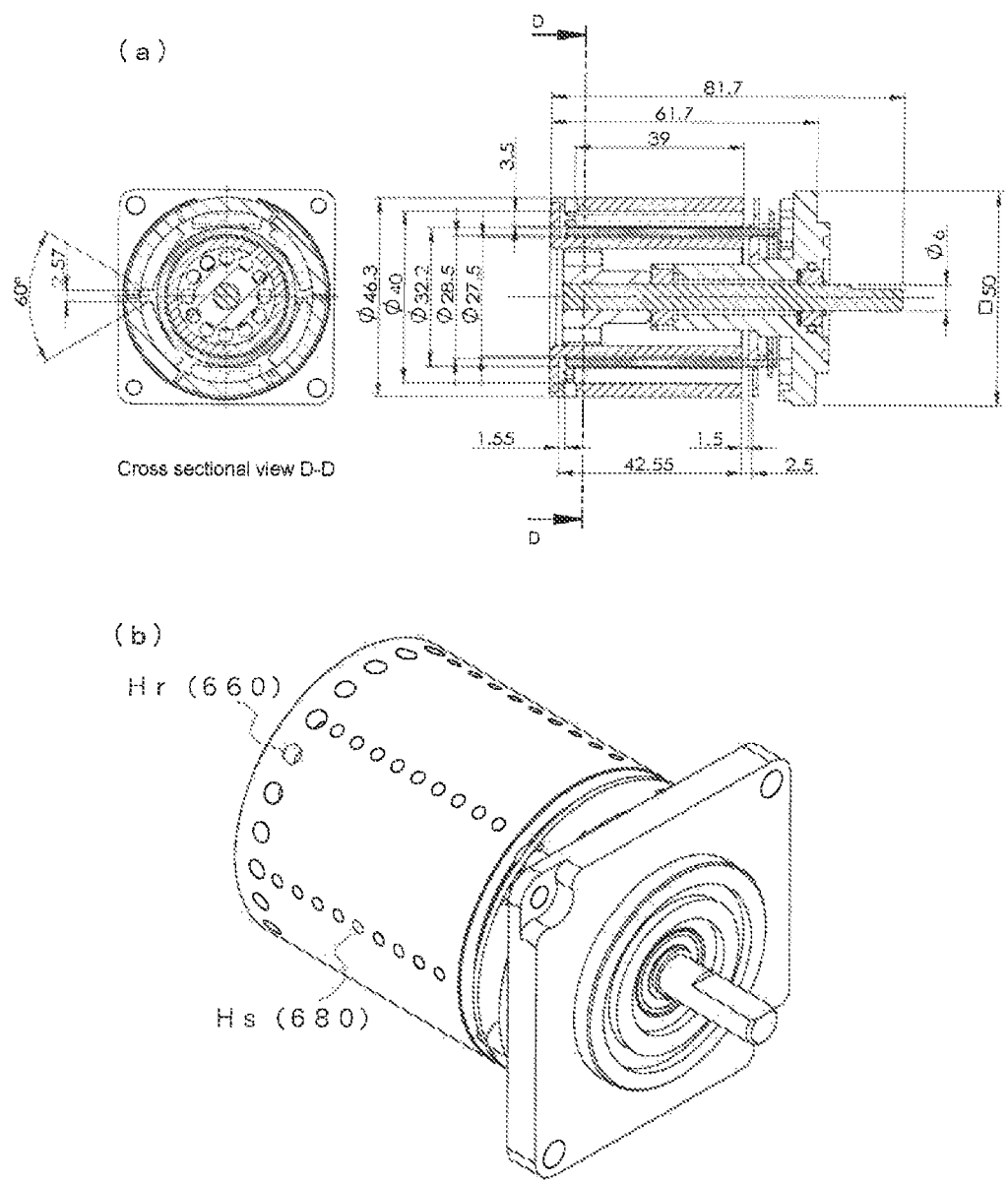
FIG. 3 is a cross sectional view (a) and a perspective view (b) of a measured rotating electrical machine in a measurement experiment for evaluating cooling effect.

FIG. 3 shows a cross sectional view (a) and a perspective view (b) of the rotating electric motor which is used as the measured motor. Further, although not shown, a temperature sensor for measuring coil temperature is attached around a part exposed in the third air space of the cylindrical coil.

The measured motor is overviewed in the following. Firstly, a cylindrical coil with a thickness of 1.85 mm and an outer diameter of 32.2 mm is inserted to a first air space 40 which forms an air gap with a width of 6.25 mm and a longitudinal length of 42.55 mm. As shown in the perspective view (b), magnets 4 are 6 neodymium magnets configured as a cuboid with a thickness of 3.5 mm, and are equipped on an inner surface of an outer yoke with an interval of 2.57 mm in longitudinal direction.

Secondly, a second air space 20 with a width of 2.5 mm and a third air space 30 with a width of 1.5 mm are formed between open end faces 530, 630 of an outer yoke 600 and an inner yoke 500 integrated with a rotor 3 and an inner surface of a stator 2 opposingly arranged with respect to the open end face. In addition, the circumference 610 of the outer yoke 600 close to the bottom 420 is provided with a plurality of first exhaust holes Hr in a row with a diameter of 3 mm, and in addition, the circumference 610 of the outer yoke 600 is provided with second exhaust holes Hs with a diameter of 2 mm consisting of arrays 670, in a lengthwise direction of the air gap 40, from the open end face 630 to the bottom 420 with equally spaced intervals on the circumference. When a measurement is performed on the pattern in which these exhaust holes are closed, each of the exhaust holes are closed by applying a resin tape from the outer surface side of the outer yoke.

Thirdly, as shown in the cross sectional view (a), a gap between an inner surface 210 of a cylindrical coil 200 and an outer surface of an inner yoke 500 is only 0.5 mm and a gap between an outer surface 220 of the cylindrical coil 200 and an inner surface of neodymium magnets 4 is only 0.4 mm.

Figure 4:
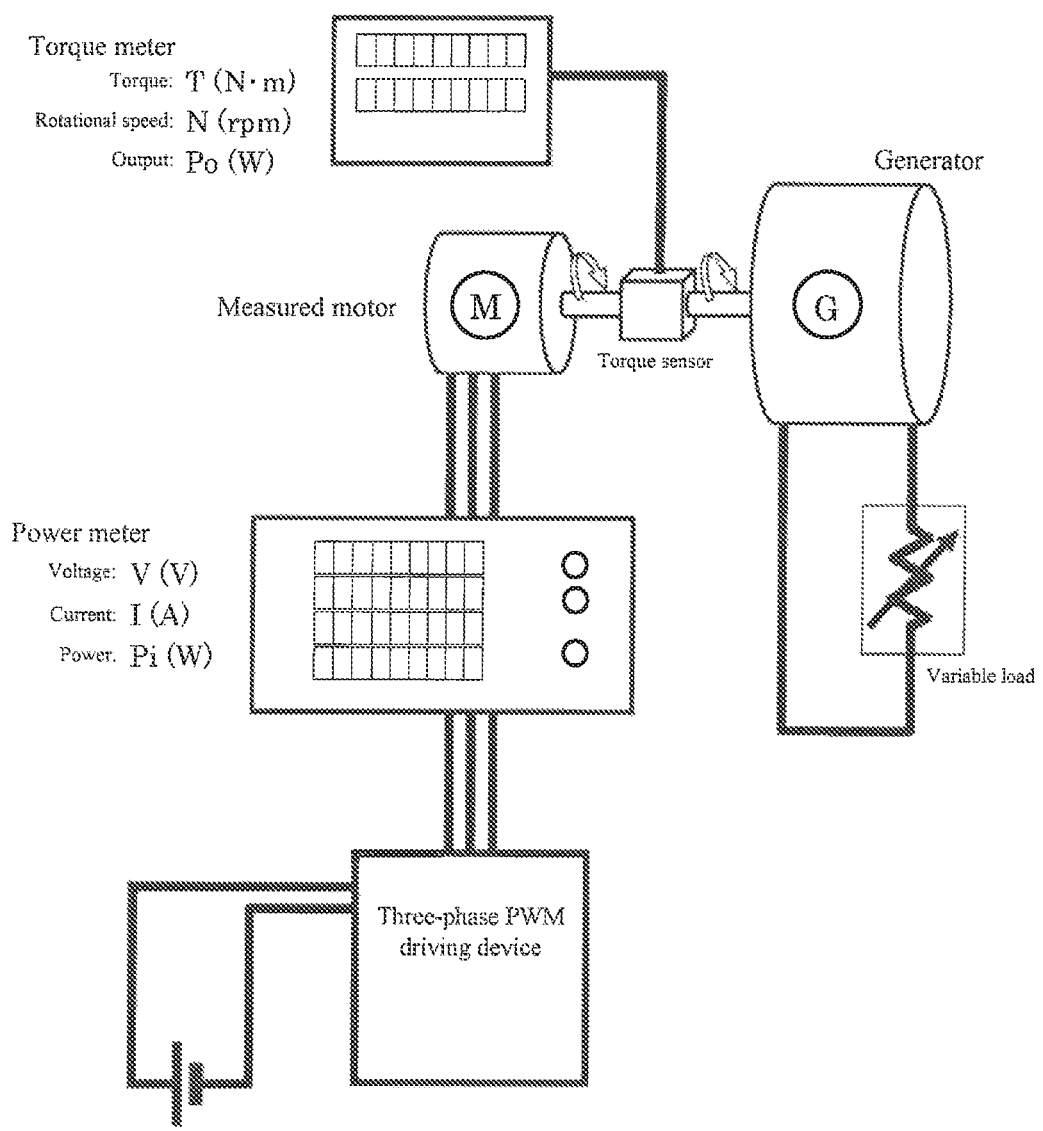
FIG. 4 is a schematic diagram of a measurement experiment for evaluating cooling effect based on one embodiment of the coreless rotating electrical machine shown in FIG. 3

FIG. 4 shows a schematic diagram of an experiment device. In the present measurement experiment, the experiment device is configured to measure output motive power generated by load torque and rotational speed, and input electric power to the measured motor, under a setting as that an output shaft of the measured motor is coupled to a generator (CPH80-E from M-link Co., Ltd.) via a torque sensor (UFM II-5 Nm from Unipulse) to which a torque meter (TM301 from Unipulse) is connected and electricity generated by the generator is consumed by a variable load (VL300 from M-Link Co., Ltd).

Since the input electric power to the measured motor varies depending on voltage and current supplied by a driving power source and power factor of driving state, the input power is measured with a power meter (PW3336 from Hioki E.E. Corporation) arranged between a motor driving device (a three-phase PWM drive power, Ican•Tech MLD750-ST) and the measured motor.

Measurement conditions are made as that, the power source voltage is 24V, the driving device is adjusted such that rotational speed of the measured motor is 2000 rpm, 4000 rpm or 6000 rpm, and the load torque is adjusted such that driving current is 8.8 Arms. The measurement conditions are adjusted under the coil temperature 30° C., and identical conditions are applied to all patterns of the exhaust holes, and the measurement is performed with fixed conditions during the measurement period. In addition, the measurement is performed with feedback control mounted on the driving device OFF.

Under such measurement condition, the coil temperature is measured and recorded.

The measurement experiment is performed repeatedly with different rotational speed and open/close patterns of the exhaust holes, and in respective measurements, the measured motor is started to drive at a point of time when temperature of the cylindrical coil, which temperature has increased high at the previous measurement, decreased to 30° C. or lower, and the coil temperature is measured over 40 minutes at every 30 seconds from that point of time.

FIGS. 6, 7 and 8 respectively show measurement result tables, for rotational speed of 2000 rpm, 4000 rpm and 6000 rpm.

In each of the tables, "Actual measurement" refers to actually measured temperature (C) of the cylindrical coil, and "Ambient" refers to ambient temperature (C).

In addition, in order to cancel out effect on experiment results due to ambient temperature variation, a value derived from adding a certain value (25° C.) to an actually measured temperature which has an ambient temperature subtracted is defined as the coil temperature of this experiment to use for the evaluation. In the table, "Coil temperature" refers to this coil temperature (° C.).

Figure 5:
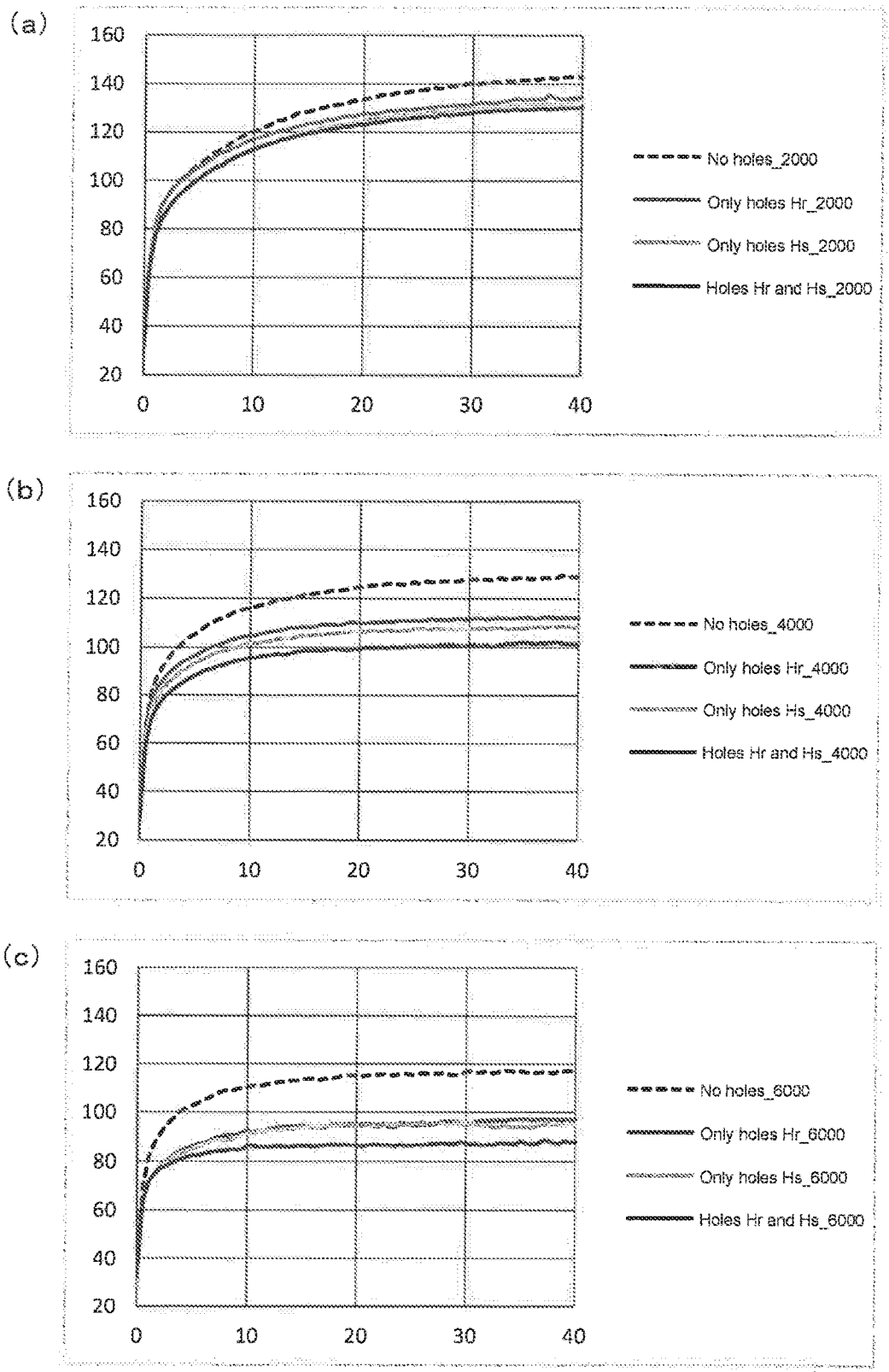
FIG. 5 shows graphs of measurement experiment results for evaluating cooling effect.

FIG. 5 shows graphs describing coil temperatures under respective measurement conditions, wherein rotational speed for (a) is 2000 rpm, (b) is 4000 rpm, (c) is 6000 rpm, respective vertical axes show coil temperature (° C.), and horizontal axes show elapsed time (minute).

From these graphs, it is found as that the coil temperature when the exhaust holes are open is significantly lower than the coil temperature when the exhaust holes are closed in every rotational speed, and also in a case where the exhaust holes are open, the coil temperature when both Hr and Hs are open is lower than when only one of Hr and Hs is open. Specifically, this is remarkable at high rotation of 6000 rpm, wherein the coil temperature after a lapse of 40 minutes is 118° C. when Hr and Hs are closed, but is 88° C. when Hr and Hs are both open, which makes difference of 30° C. Also at 2000 rpm, difference of 13° C. is shown, and at 4000 rpm, difference of 28° C. is shown. It is apparent that the present invention has a remarkable cooling effect.

In addition, aside from what can be understood from these graphs, it is found as that when open/close conditions of the exhaust holes are fixed, the higher the rotational speed is, the lower the coil temperature becomes. Specifically, when Hr and Hs are both open, the coil temperature after a lapse of 40 minutes is 130° C. at 2000 rpm, but is 101° C. at 4000 rpm, and 88° C. at 6000 rpm, and thus, the higher the rotational speed is, the lower the coil temperature becomes. A similar trend can be found also in a case where only one of Hr and Hr is open. That is to say, it means that the cooling effect according to the present invention is exerted more remarkably under high-speed rotation.

[Measurement Experiment for Evaluating Output Increase Effect by Exhaust Holes]

Experiments for evaluating output increase effect by the cooling effect of the rotating electrical machine according to the present invention are performed. The measured motor and experiment device used in the experiments are similar to what are used in the measurement experiment of the cooling effect. The following two patters are provided for the exhaust holes:

(1) when Hr and Hr are both closed (comparative example)
(2) when Hr and Hr are both open (the third aspect of the present invention).

The measurement condition is made as that, the power source voltage is 36V, rotational speed of the measured motor is adjusted to be 6000 rpm, a steady state is considered as when 30 minutes has elapsed after start of driving and the load torque is adjusted such that the coil temperature at that time is around 126° C.

Figure 9:
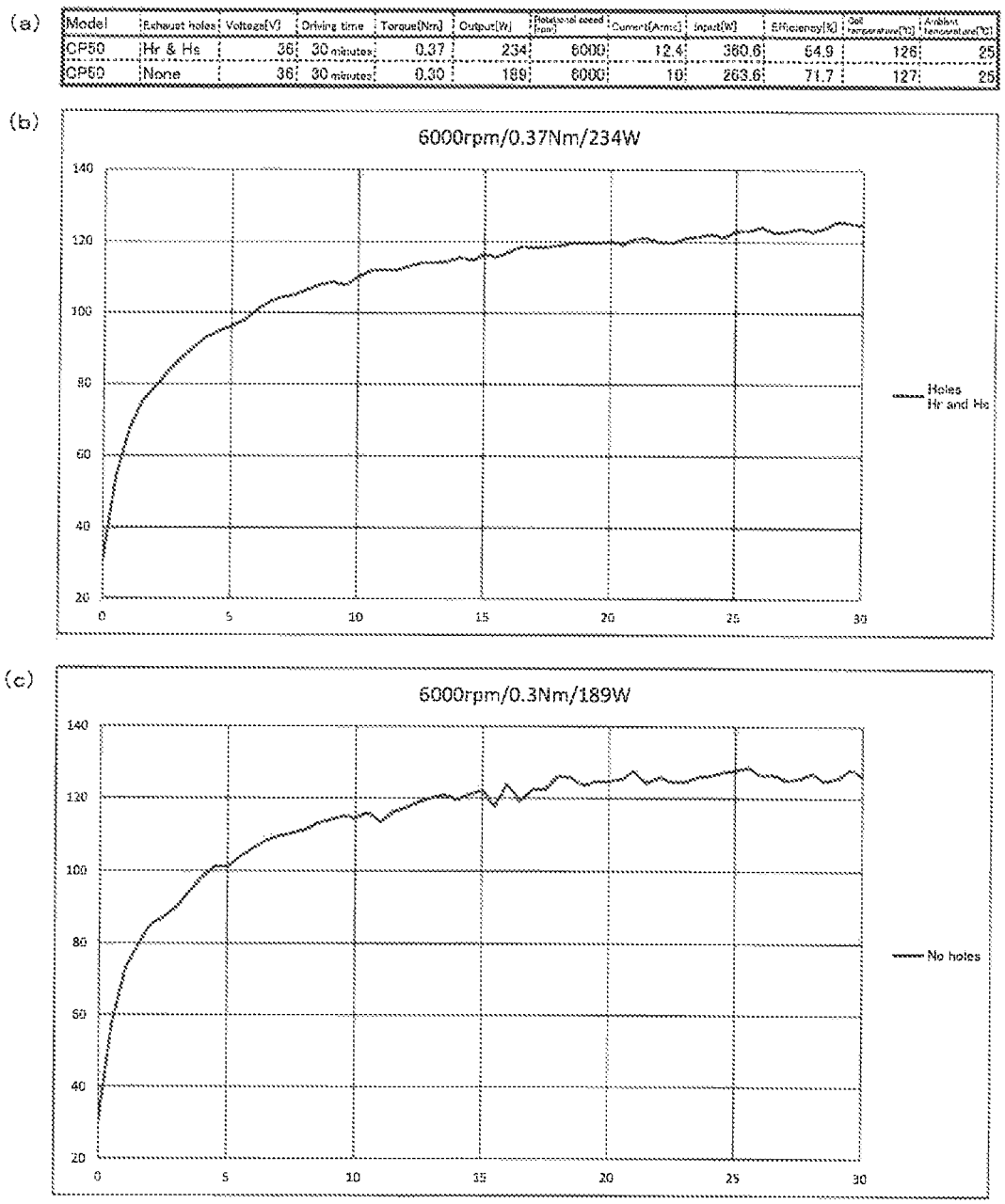
FIG. 9 shows a table and a graph of measurement experiment results for evaluating output increase effect.

FIG. 9 consists of a table (a) which compares results of a case where the exhaust holes are closed and a case where the exhaust holes are open, a graph (b) showing time change of a coil body temperature when the exhaust holes are closed, and a graph (c) showing results of the experiment.

As can been seen from the table (a) of FIG. 9, regardless of the fact that a power source voltage, rotational speed and coil temperature are the same, it is confirmed that output of the motor with open exhaust holes is increased by 24% compared with the motor with closed exhaust holes, from 189 W to 234 W. When rotational speed is fixed, since torque is proportional to output, it is derived that torque is also increased by around 23% from 0.30 Nm to 0.37 Nm. Further, the torque values shown herein are theoretical values determined from output and rotational speed. By the way, input is increased by around 37% from 263.6 W to 360.6 W, which exceeds increase of the output, so efficiency may be decreased, but it is considered that this is an evidence where the cooling effect of the present invention of maintaining the coil temperature within an allowable range is exerted, even when a loss mount due to heat generation in input power is increased because of increase of load. Thus, the technical problem of maintaining the coil temperature within the allowable range, even when a loss mount due to heat generation in input power is increased, which seemed unachievable has been solved.

Although the present invention has been described for preferable embodiments, those skilled in the art may understand that various modifications may be made and elements may be replaced with equivalents without departing the scope of the present invention. Therefore, the present invention should not be limited to specific embodiments disclosed as the best mode of embodiments considered for implementing the present invention, and it is intended that the present invention encompasses all embodiments which belong to claims.

REFERENCE SIGNS LIST

1: Structure of a coreless rotating electrical machine including armature
2: Stator
3: Rotor
4: Magnets
9: Armour
10: Coreless rotating electrical machine including armature
20: Second air space
30: Third air space
40: First air space which forms air gap
41: Inner clearance
42: Intermediate clearance
43: Outer clearance
70: Ambient air taken into second air space
80: Ambient air taken into third air space
90: Outlet
100: Drive shaft
200: Cylindrical coil
201: (Fixed) End face of cylindrical coil
202: (Open) End face of cylindrical coil
210: Inner surface of cylindrical coil
220: Outer surface of cylindrical coil
300: Lid-type mount
310: Center part of lid-type mount
400: Cup-type mount
410: Center of cup-type mount
420: Bottom of cup-type mount
430: Intake holes
431: Filter for intake holes
500: Inner cylindrical air-channel forming body or inner yoke
510: Inner side of inner cylindrical air-channel forming body or inner yoke
520: Outer surface of inner cylindrical air-channel forming body or inner yoke
530: Open end face of inner cylindrical air-channel forming body or inner yoke
540: Inner side space of inner cylindrical air-channel forming body or inner yoke
600: Outer cylindrical air-channel forming body or outer yoke
610: Inner surface of outer cylindrical air-channel forming body or outer yoke
620: Outer surface of outer cylindrical air-channel forming body or outer yoke
630: Open end face of outer cylindrical air-channel forming body or outer yoke
910: Vent hole

The invention claimed is:

1. A coreless rotating electrical machine comprising:
a stator having an energizeable coreless cylindrical coil formed of a cylindrical shape having a laminate structure configured by a plurality of conductive metal sheets with a plurality of linear parts being spaced in a longitudinal direction, in such a manner that each linear part of the conductive metal sheets is covered by an insulating layer, and a lid-type mount which fixes one of end faces of the cylindrical coil, and in which a drive shaft is rotatably coupled to a center part of the lid-type mount, and
a rotor having a cup-type mount opposingly positioned with respect to the lid-type mount, having a bottom, an inner cylindrical air-channel forming body and an outer cylindrical air-channel forming body, and in which the drive shaft rotatably coupled to the lid-type mount is coupled and fixed to a center part of the cup-type mount, and a plurality of magnets equipped on an inner surface of the outer cylindrical air-channel forming body and/or an outer surface of the inner cylindrical air-channel forming body,
wherein the cup-type mount has a first air space which forms an air gap formed by the bottom, the inner cylindrical air-channel forming body and the outer cylindrical air-channel forming body, the cylindrical coil is arranged in the air gap as suspended such that another end face of the cylindrical coil leaves a clearance between the bottom, with the plurality of magnets exposed; a second air space positioned in an inner side of the cylindrical coil; and a third air space positioned in an outer side of the cylindrical coil between open end faces of the cup-type mount and the lid-type mount,
characterized in that, the cup-type mount has intake holes leading to the second air space on the bottom and a plurality of exhaust holes leading to the air gap, positioned in a row around a circumference of the outer cylindrical air-channel forming body, close to the bottom, wherein ambient air taken into the second air space via the intake holes and ambient air taken into the air gap via the third air space, under differential pressure generated around the rotor by rotation thereof, are configured to flow through inside the air gap to directly cool the plurality of magnets exposed in the air gap and the inner and outer surfaces of the cylindrical coil arranged in the air gap, and to be discharged via the exhaust holes.

2. A coreless rotating electrical machine comprising:
a stator having an energizeable coreless cylindrical coil formed of a cylindrical shape having a laminate structure configured by a plurality of conductive metal sheets with a plurality of linear parts being spaced in a longitudinal direction, in such a manner that each linear part of the conductive metal sheets is covered by an insulating layer, and a lid-type mount which fixes one of end faces of the cylindrical coil, and in which a drive shaft is rotatably coupled to a center part of the lid-type mount, and
a rotor having a cup-type mount opposingly positioned with respect to the lid-type mount, having a bottom, an inner cylindrical air-channel forming body and an outer cylindrical air-channel forming body, and in which the drive shaft rotatably coupled to the lid-type mount is coupled and fixed to a center part of the cup-type mount, and a plurality of magnets equipped on an inner surface of the outer cylindrical air-channel forming body and/or an outer surface of the inner cylindrical air-channel forming body,
wherein the cup-type mount has a first air space which forms an air gap formed by the bottom, the inner cylindrical air-channel forming body and the outer cylindrical air-channel forming body, the cylindrical coil is arranged in the air gap as suspended such that another end face of the cylindrical coil leaves a clearance between the bottom, with the plurality of magnets exposed; a second air space positioned in an inner side of the cylindrical coil; and a third air space positioned in an outer side of the cylindrical coil between open end faces of the cup-type mount and the lid-type mount,
characterized in that, the cup-type mount has intake holes leading to the second air space on the bottom and a plurality of exhaust holes leading to the air gap, consisting of arrays in a lengthwise direction of the air gap, from the open end face to the bottom on the circumference of the outer cylindrical air-channel forming body, wherein ambient air taken into the second air space via the intake holes and ambient air taken into the air gap via the third air space, under differential pressure generated around the rotor by rotation thereof, are configured to flow through inside the air gap to directly cool the plurality of magnets exposed in the air gap and the inner and outer surfaces of the cylindrical coil arranged in the air gap, and to be discharged via the exhaust holes.

3. A coreless rotating electrical machine comprising:
a stator having an energizeable coreless cylindrical coil formed of a cylindrical shape having a laminate structure configured by a plurality of conductive metal sheets with a plurality of linear parts being spaced in a longitudinal direction, in such a manner that each linear part of the conductive metal sheets is covered by an insulating layer, and a lid-type mount which fixes one of end faces of the cylindrical coil, and in which a drive shaft is rotatably coupled to a center part of the lid-type mount, and
a rotor having a cup-type mount opposingly positioned with respect to the lid-type mount, having a bottom, an inner cylindrical air-channel forming body and an outer cylindrical air-channel forming body, and in which the drive shaft rotatably coupled to the lid-type mount is coupled and fixed to a center part of the cup-type mount, and a plurality of magnets equipped on an inner surface of the outer cylindrical air-channel forming body and/or an outer surface of the inner cylindrical air-channel forming body,
wherein the cup-type mount has a first air space which forms an air gap formed by the bottom, the inner cylindrical air-channel forming body and the outer cylindrical air-channel forming body, the cylindrical coil is arranged in the air gap as suspended such that another end face of the cylindrical coil leaves a clearance between the bottom, with the plurality of magnets exposed; a second air space positioned in an inner side of the cylindrical coil; and a third air space positioned in an outer side of the cylindrical coil between open end faces of the cup-type mount and the lid-type mount,
characterized in that, the cup-type mount has intake holes leading to the second air space on the bottom and a plurality of first exhaust holes leading to the air gap, positioned in a row around a circumference of the outer cylindrical air-channel forming body, close to the bottom, and a plurality of second exhaust holes leading to the air gap, consisting of arrays in a lengthwise direction of the air gap, from the open end face to the bottom on the circumference of the outer cylindrical air-channel forming body, wherein ambient air taken into the second air space via the intake holes and ambient air taken into the air gap via the third air space, under differential pressure generated around the rotor by rotation thereof, are configured to flow through inside the air gap to directly cool the plurality of magnets exposed in the air gap and the inner and outer surfaces of the cylindrical coil arranged in the air gap, and to be discharged via the first and the second exhaust holes.

* * * * *